United States Patent
Maeda et al.

(10) Patent No.: US 10,931,634 B2
(45) Date of Patent: *Feb. 23, 2021

(54) SECURITY APPARATUS, ATTACK DETECTION METHOD, AND STORAGE MEDIUM

(71) Applicant: Panasonic Intellectual Property Corporation of America, Torrance, CA (US)

(72) Inventors: Manabu Maeda, Osaka (JP); Jun Anzai, Kanagawa (JP); Yoshihiro Ujiie, Osaka (JP); Masato Tanabe, Aichi (JP); Takeshi Kishikawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 15/880,769

(22) Filed: Jan. 26, 2018

(65) Prior Publication Data

US 2018/0167360 A1 Jun. 14, 2018

Related U.S. Application Data

(63) Continuation of application No. PCT/JP2016/004335, filed on Sep. 26, 2016.
(Continued)

(30) Foreign Application Priority Data

Aug. 4, 2016 (JP) .............................. JP2016-153816

(51) Int. Cl.
*H04L 29/06* (2006.01)
*B60R 16/023* (2006.01)
(Continued)

(52) U.S. Cl.
CPC ........ *H04L 63/0209* (2013.01); *B60R 16/023* (2013.01); *G06F 21/55* (2013.01);
(Continued)

(58) Field of Classification Search
CPC ........ G06F 21/00; G06F 3/0488; G06F 11/00; G06F 17/50; G06F 21/85; G06F 21/55;
(Continued)

(56) References Cited

U.S. PATENT DOCUMENTS 7,872,988 B1 * 1/2011 Hatley .................... H04L 43/50
370/252
8,024,625 B2 * 9/2011 Noguchi ................ H04B 3/546
714/704

(Continued)

FOREIGN PATENT DOCUMENTS

CN 104967588 A 10/2015
JP 2006-146600 6/2006
(Continued)

OTHER PUBLICATIONS

Extended European Search Report, dated Aug. 27, 2018, by the European Patent Office (EPO) for the related European Patent Application No. 16853238.0.
(Continued)

*Primary Examiner* — Thanhnga B Truong
(74) *Attorney, Agent, or Firm* — Greenblum & Bernstein, P.L.C.

(57) ABSTRACT

A gateway serving as a security apparatus connected to one or a plurality of buses includes a receiver that receives a frame from a bus, a parameter storage that stores an examination parameter defining a content of an examination of the frame, an updater configured to, in a case where a predetermined condition is satisfied for the frame received by the receiver, update the examination parameter stored in the
(Continued)

parameter storage, and an examiner that performs an examination, based on the examination parameter stored in the parameter storage, in terms of judgment of whether or not the frame received by the receiver is an attack frame.

14 Claims, 20 Drawing Sheets

Related U.S. Application Data

(60) Provisional application No. 62/239,465, filed on Oct. 9, 2015.

(51) Int. Cl.
| | |
|---|---|
| *G06F 21/55* | (2013.01) |
| *H04L 12/28* | (2006.01) |
| *H04L 12/40* | (2006.01) |
| *G06F 21/85* | (2013.01) |
| *H04L 9/36* | (2006.01) |
| *H04L 29/08* | (2006.01) |

(52) U.S. Cl.
CPC .............. *G06F 21/85* (2013.01); *H04L 9/36* (2013.01); *H04L 12/28* (2013.01); *H04L 12/40006* (2013.01); *H04L 63/0245* (2013.01); *H04L 63/14* (2013.01); *H04L 63/1441* (2013.01); *H04L 67/12* (2013.01)

(58) Field of Classification Search
CPC ....... H04L 12/26; H04L 9/36; H04L 63/0209; H04L 12/40006; H04L 12/28; H04L 63/14; H04L 63/0245; G09G 5/10; H04B 7/26; B60R 16/023; G01C 21/26; G05B 23/02

See application file for complete search history.

(56) References Cited

U.S. PATENT DOCUMENTS

| | | | |
|---|---|---|---|
| 8,995,662 B2 * | 3/2015 | Rubin | G08G 1/161 |
| | | | 380/255 |
| 9,575,656 B2 * | 2/2017 | Huang | G06F 3/0481 |
| 2012/0243426 A1 | 9/2012 | Matsui et al. | |
| 2013/0081106 A1 * | 3/2013 | Harata | G06F 21/85 |
| | | | 726/2 |
| 2014/0032800 A1 | 1/2014 | Peirce et al. | |
| 2014/0337976 A1 | 11/2014 | Moeller et al. | |
| 2015/0113638 A1 | 4/2015 | Valasek et al. | |
| 2015/0172306 A1 | 6/2015 | Kim et al. | |
| 2015/0191135 A1 | 7/2015 | Ben Noon et al. | |
| 2015/0191136 A1 | 7/2015 | Ben Noon et al. | |
| 2015/0191151 A1 | 7/2015 | Ben Noon et al. | |
| 2015/0195297 A1 | 7/2015 | Ben Noon et al. | |
| 2015/0358351 A1 | 12/2015 | Otsuka et al. | |
| 2016/0294725 A1 * | 10/2016 | Maise | H04L 12/40202 |

FOREIGN PATENT DOCUMENTS

| | | |
|---|---|---|
| JP | 2007-067812 A | 3/2007 |
| JP | 2010-251837 | 11/2010 |
| JP | 2012-204936 A | 10/2012 |
| JP | 2014-146868 A | 8/2014 |
| JP | 2015-136107 | 7/2015 |
| WO | 2013/144962 A1 | 10/2013 |
| WO | 2014/115455 | 7/2014 |
| WO | 2014/199687 | 12/2014 |

OTHER PUBLICATIONS

Russello, Giovanni and Dulay, Naranker, "An Architectural Approach for Self-Managing Security Services", in Advanced Information Networking and Applications Workshops, WAINA 2009, International Conference, IEEE, 2009, pp. 153-158.

International Search Report of PCT application No. PCT/JP2016/004335 dated Nov. 29, 2016.

English Language Translation of Chinese Search Report, dated Apr. 17, 2020, for the related Chinese Patent Application No. 201680021041.6.

* cited by examiner

| RECEPTION ID LIST |
|---|
| 1 |
| 2 |
| 3 |
| 4 |

| TRANSFER SOURCE | TRANSFER DESTINATION | ID |
|---|---|---|
| 200a | 200b | * |
| 200b | 200a | 3 |

SECURITY APPARATUS, ATTACK DETECTION METHOD, AND STORAGE MEDIUM

BACKGROUND

1. Technical Field

The present disclosure relates to a technique to detect an attack frame which is an invalid frame transmitted in a network used in communication by an electronic control unit installed in a vehicle or the like.

2. Description of the Related Art

In systems in vehicles according to recent techniques, many apparatuses called electronic control units (ECUs) are installed. A network via which those ECUs are connected is called an on-board network. There are many standards regarding on-board networks. Among those standards, one of the most major on-board network standards is the CAN (Controller Area Network) standard defined in ISO11898-1.

In CAN, a bus including two wires is used as a communication channel, and ECUs connected to the bus are called nodes. Each node connected to the bus transmits and receives a message called a frame. Furthermore, in CAN, no identifier exists to indicate a transmission destination or a transmission source. A transmission node transmits frames (that is, transmits a signal over the bus) each attached with an ID called a message ID. Each reception node receives only frames with predetermined message IDs (that is, reads a signal from the bus).

In a system in a vehicle, each of many ECUs transmits and receives various frames. In a case where an ECU having a function of communicating with an external device is attacked from the outside and as a result, this ECU becomes capable of transmitting an invalid message (attack frame), this ECU becomes capable of making an attack by impersonating another ECU and transmitting a frame. This makes it possible for this ECU to control the vehicle in an unauthorized manner. As a technique to detect such an attack and protects therefrom, it is known to detect an attack (invalidity) by comparing a data reception period with a predetermined period (see, International Publication No. WO 2014/115455).

SUMMARY

However, in the technique disclosed in International Publication No. WO 2014/115455, detectable attacks are limited to those attacks that are transmitted at intervals inconsistent with the predetermined period, and thus, this technique is not necessarily effective to detect various different attacks.

One non-limiting and exemplary embodiment provides a security apparatus capable of detecting an attack frame, adaptively to a wide variety of variable attacks, and also provides an attack detection method capable of detecting an attack frame adaptively to a wide variety of variable attacks and a program for causing a security apparatus to perform a process of detecting an attack frame.

In one general aspect, the techniques disclosed here feature a security apparatus connected to at least one bus, including a receiver that receives a frame from the at least one buses, a parameter storage that stores at least one examination parameter defining a content of an examination on a frame, processing circuitry that, in operation, performs operations including in a case where a predetermined condition is satisfied for the frame received by the receiver, updating the at least one examination parameter stored in the parameter storage, and executing an examination, based on the at least one examination parameter stored in the parameter storage, as to whether the frame received by the receiver is an attack frame.

General or specific embodiments may be implemented by an apparatus, a system, a method, an integrated circuit, a computer program, a computer-readable storage medium such as a CD-ROM, or any selective combination of an apparatus, a system, a method, an integrated circuit, a computer program, and a storage medium.

According to the present disclosure, it is possible to update an examination parameter used in the examination as to whether a received frame is an attack frame or not, which makes it possible to properly detect attack frames, adaptively to a wide variety of variable attacks.

Additional benefits and advantages of the present disclosure will become apparent from the specification and drawings. The benefits and advantages may be individually obtained by the various embodiments and features of the specification and drawings. However, it does not necessarily need to provide all such benefits and advantages.

DETAILED DESCRIPTION

Figure 1:
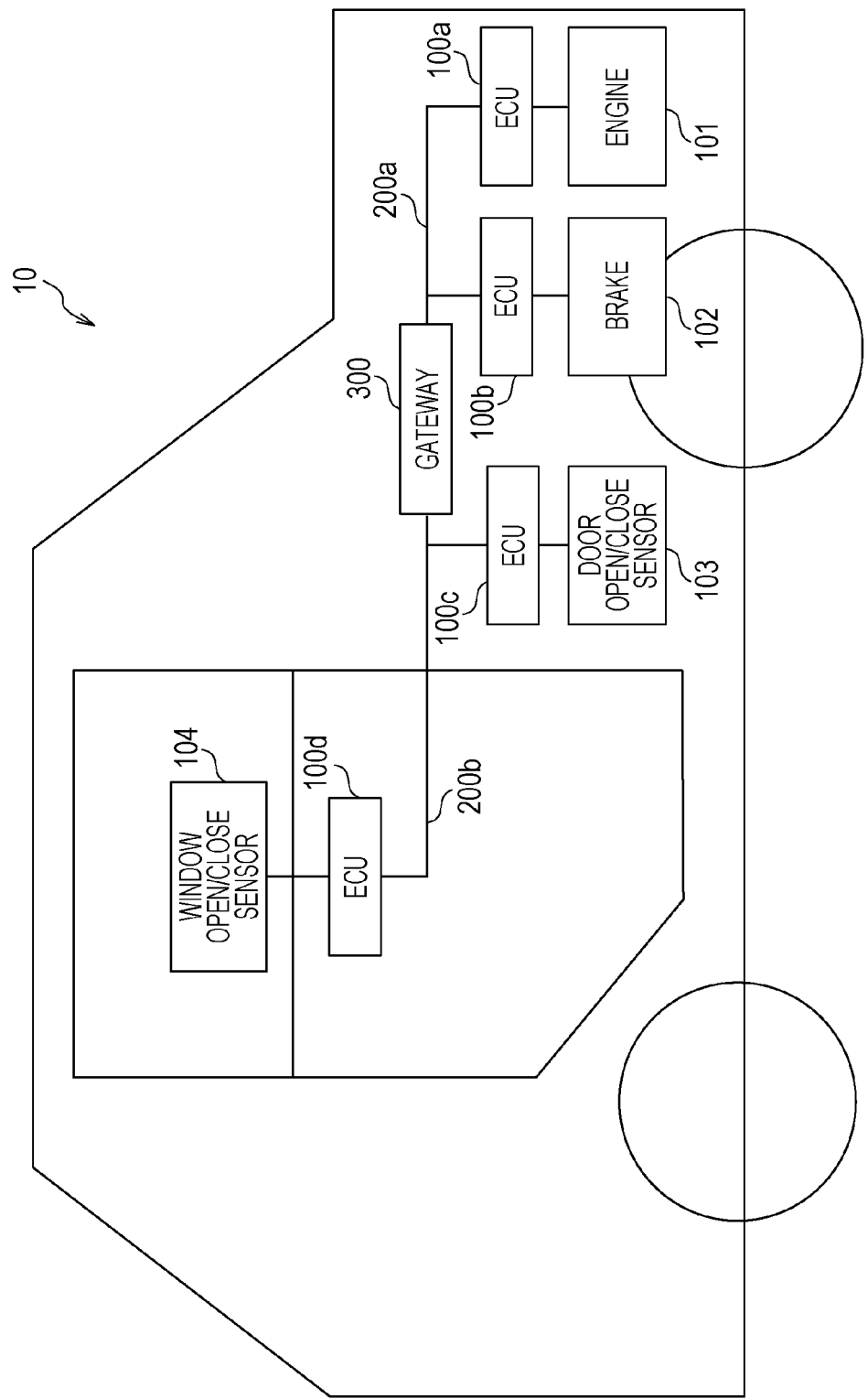
FIG. 1 is a diagram illustrating a total configuration of an in-vehicle network system according to a first embodiment.

In an aspect of the present disclosure, a security apparatus connected to at least one bus includes a receiver that receives a frame from the at least one buses, a parameter storage that stores at least one examination parameter defining a content of an examination on a frame, processing circuitry that, in operation, performs operations including in a case where a predetermined condition is satisfied for the frame received by the receiver, updating the at least one examination parameter stored in the parameter storage, and executing an examination, based on the at least one examination parameter stored in the parameter storage, as to whether the received frame is an attack frame. Thus, it is possible to update, depending on the received frame, the examination parameter used in the examination as to whether the frame received by the receiver is an attack frame or not, and thus, it is possible to properly detect attack frames adaptively to a wide variety of variable attacks.

In the security apparatus, the security apparatus may be installed in a vehicle, and the vehicle may include at least one electronic control unit that transmits and receives a frame via the at least one bus according to Controller Area Network (CAN) protocol. This makes it possible to properly detect an attack frame when the attack frame is transmitted in an on-board network for transmitting and receiving frames between electronic control units (ECUs) according to the CAN.

In the security apparatus, the operations my further include performing a process depending on a result of the execution of the examination such that an influence of an attack frame on the at least one electronic control unit is suppressed. This makes it possible to protect from an attack frame (to suppress an influence of an attack frame on ECUs).

In the security apparatus, the at least one examination parameter may include a plurality of examination parameters defining contents of examinations on a frame, the contents being different from each other, the operations may further include judging whether each of a plurality of predetermined conditions is satisfied for the frame received by the receiver, and depending on a result of the judgment, determining an examination parameter to be subjected to updating from the plurality of examination parameters, wherein the updating updates the determined examination parameter. Thus, depending on the result of check in terms of each condition, it is possible to dynamically update various examination parameters used in judging whether the received frame is an attack frame or not, which makes it possible to properly detect attack frames.

In the security apparatus, the frame received by the receiver may be a data frame including including an ID field storing an ID, Data Length Code (DLC), and a data field, the judging may include at least one of the following: judging whether a first condition is satisfied for a value of the ID; judging whether a second condition is satisfied for a value of the DLC; judging whether a third condition is satisfied for a value of the DLC; judging whether a fourth condition is satisfied for a frequency of transmission of one or more frames having the same value of the ID in a predetermined unit time; and judging whether a fifth condition is satisfied for a value stored in the data field; the plurality of examination parameters may include an ID examination parameter associated with the examination of the value of the ID; a DLC examination parameter associated with the examination of the value of the DLC; a transmission period examination parameter associated with the examination of the transmission period; a frequency-of-transmission examination parameter associated with the examination of the frequency of transmission; and a data examination parameter associated with the examination of the value of the data stored in the data field, the executing of the examination may be performed based on each of the plurality of examination parameters. This makes it possible to perform each examination to detect an attack frame based on the content of each field of the frame or the transmission period or the frequency of transmission of the frame or the like. Furthermore, it is possible to update an examination parameter such as a threshold value or the like used in each examination, based on the content of each field of the frame or the transmission period or the frequency of transmission of the frame or the like.

In the security apparatus, the judging may be executed by referring to the ID stored in the ID field of the frame received by the receiver at least for one of the plurality of predetermined conditions. This makes it possible to perform the examination parameter update based on the result of the judgement in terms of the ID (the message ID).

In the security apparatus, the third condition may be that a reception interval between two frames having the same value of the ID is out of a predetermined allowable range. As a result, the examination parameter update is performed depending on the result of the judgement based on the frame transmission period. Therefore, in a case where an attack frame that causes, for example, the transmission period to be disturbed is transmitted, the examination parameter may be updated in response to an occurrence of an abnormal transmission period such that the update makes it possible to more effectively detect the attack frame, thereby making it possible to properly detect the attack frame.

In the security apparatus, the plurality of examination parameters may include the frequency-of-transmission examination parameter, the frequency-of-transmission examination parameter may include a threshold value indicating an upper limit of an allowable range of the frequency of transmission, in the executing of the examination, in a case where the frequency of transmission of the frame received by the receiver is larger than the threshold value in the frequency-of-transmission examination parameter, it may be judged that the frame is an attack frame, and in the updating, in a case where it is judged that the third condition is satisfied, the threshold value in the frequency-of-transmission examination parameter may be updated. Thus, the frequency-of-transmission examination parameter associated with the frequency of transmission is updated based on the judgement result in terms of the frame transmission period. Therefore, in a case where an attack frame that causes, for example, the transmission period to be disturbed is transmitted, the frequency-of-transmission examination parameter may be updated in response to an occurrence of an abnormal transmission period such that the update makes it possible to more effectively to detect the attack frame, thereby making it possible to properly detect the attack frame.

In the security apparatus, the plurality of examination parameters may include the data examination parameter, the data examination parameter may include a threshold value indicating an upper limit of an allowable range in which the data stored in the data field is allowed to change, in the executing of the examination, in a case where a change in the data stored in the data field of the frame received by the receiver is greater than the threshold value in the data examination parameter, it may be judged that the frame is an attack frame, and in the updating, in a case where it is judged that the third condition is satisfied, the threshold value in the data examination parameter may be updated to a smaller value. Thus, the data examination parameter associated with the upper limit of the change in data is updated depending on the result of the judgement based on the frame transmission period. For example, in response to an occurrence of an abnormal transmission period, the upper limit of the allowable range of the change in data in the data examination parameter may be updated to a smaller value, thereby making it possible to properly detect the attack frame.

In the security apparatus, the fourth condition may be that the frequency of transmission is greater than an upper limit of a predetermined allowable range, the plurality of examination parameters may include the transmission period examination parameter, the transmission period examination parameter may include a threshold value indicating an allowable range of the transmission period, and in the updating, in a case where it is judged that the fourth condition is satisfied, the threshold value in the transmission period examination parameter may be updated. Thus, the transmission period examination parameter associated with the allowable range of the transmission period is updated based on the judgement result in terms of the frequency of frame transmission. For example, by changing the allowable range of the transmission period in the transmission period examination parameter to a narrower range in response to a detection of an abnormal frequency of transmission, there is a possibility that it is possible to properly detect an attack frame.

In the security apparatus, the fourth condition may be that the frequency of transmission is greater than an upper limit of a predetermined allowable range, each of the plurality of examination parameters may be one of the following: the DLC examination parameter; the transmission period examination parameter; and the data examination parameter, the DLC examination parameter may include a threshold value indicating an allowable range of a value of the DLC, the transmission period examination parameter may include a threshold value indicating an allowable range of the transmission period, and the data examination parameter may include a threshold value indicating an allowable range of a value of the data, in the updating, in a case where it is judged that the fourth condition is satisfied for one frame, the threshold value in the plurality of examination parameters used as a content of an examination on a frame having the same ID as the ID of the one frame may be updated such that a corresponding allowable range is narrowed. The threshold values indicating the allowable range of the DLC value are, for example, threshold values indicating the upper and lower limits of the DLC value, the threshold values indicating the allowable range of the transmission period are, for example, threshold values indicating the upper and lower limits of the allowable range, and the threshold values indicating the allowable range of the value of data are, for example, threshold values indicating the upper and lower limits of the value of data. Thus, in response to a detection of abnormality in the frequency of frame transmission, the threshold values indicating the allowable range for normal frames in the various examination parameters are updated such that the allowable range is narrowed. Therefore, it may become possible to efficiently detect whether a frame is an attack frame or not depending on the possibility (the check result in terms of the frequency of transmission) that the attack frame is transmitted.

In the security apparatus, the executing of the examination may be performed after the ID field of the frame is received and before a part following the data field is received. Thus, it may be possible to perform the examination at a point of time at which it is possible to perform the judgement based on the message ID and at which it is possible to protect from the attack frame (to disable the attack frame) by transmitting an error frame. Thus, it may be possible to perform proper protection from an attack.

In the security apparatus, the operations may further include at a point of time when judgment results are obtained for the respective predetermined conditions, determining whether the plurality of examination parameters includes an examination parameter that is to be updated depending on the judgment results, in the updating, in a case where it is determined that updating is to be performed, updating the examination parameter determined to be updated, and performing the executing of the examination depending on a state of updating of each of the plurality of examination parameters. This makes it possible to perform the examination, at a proper point of time, as to whether the received frame is an attack frame. Thus, it becomes possible to perform protection from the attack frame at a proper point of time.

In the security apparatus, in the executing of the examination, in a case where the predetermined condition is satisfied for the frame received by the receiver, it may be judged that that the frame is an attack frame, and in the executing of the process, the process may be performed on the frame judged as the attack frame such that an influence of the attack frame on at least one electronic control unit is suppressed. Thus, it is possible, in the updater responsible for the condition judgement (check functions) as to the update of examination parameters, to perform the judgement as to whether a frame is an attack frame or not. Therefore, in a case where the updater judges that a frame is an attack frame, is not necessary for the examiner to perform examinations, which may make it possible to quickly perform the judgement in terms of attack frame.

According an aspect of the present disclosure, a method, for an on-board network system in which a plurality of electronic control units transmit and receive a frame via at least one bus, includes receiving a frame from the at least one bus, in a case where a predetermined condition is satisfied for the frame received in the receiving, updating an examination parameter defining a content of a frame examination, and performing a judgment, based on the updated examination parameter, as to whether the frame received in the receiving is an attack frame or not. Thus, the examination parameter used in the examination as to whether a frame is an attack frame or not is updated depending on the received frame, and thus, it is possible, in the examination step, to properly detect attack frames, adaptively to a wide variety of variable attacks.

According to an aspect, the present disclosure provides a computer-readable non-transitory storage medium storing a program, the program causing, when executed by a processor disposed in a security apparatus connected to least one bus, the processor to execute a method, the method including receiving a frame from the at least one bus, in a case where a predetermined condition is satisfied for the frame received in the receiving, updating an examination parameter defining a content of a frame examination, and performing a judgment, based on the updated examination parameter, as to whether the frame received in the receiving is an attack frame. By installing the program on an apparatus including a processor and executing the program, it becomes possible for the apparatus to function as a security apparatus. This security apparatus is capable of properly detecting attack frames, adaptively to a wide variety of variable attacks.

General or specific embodiments may be implemented by a system, a method, an integrated circuit, a computer program, a computer-readable storage medium such as a CD-ROM, or any selective combination of a system, a method, an integrated-circuit, a computer program, and a storage medium.

An on-board network system including a security apparatus according to an embodiment is described below with reference to drawings. Note that each embodiment described below is for illustrating a specific example of an implementation of the present disclosure. In the following embodiments, values, constituent elements, locations of elements, manners of connecting elements, steps, the order of steps, and the like are described by way of example but not limitation. Among constituent elements described in the following embodiments, those constituent elements that are not described in independent claims are optional. Note that each drawing is a schematic diagram, which does not necessarily provide a strict description.

First Embodiment

An attack detection method, used in an on-board network system in which a plurality of electronic control units (ECUs) transmit and receive frames via a bus, and a security apparatus provided in the on-board network system are described below.

The attack detection method is a method for detecting an attack frame which is an unauthorized frame when the attack frame is transmitted on a bus used in communication between ECUs installed in a vehicle. The security apparatus (the on-board security apparatus) in the on-board network system is an apparatus having at least an attack detection function (a function of detecting attack frames) relating to the attack detection method. The security apparatus may have a protection function to prevent each ECU from being influenced by attack frames, and the attack detection function is a function based on which the protection is achieved. In a case where the security apparatus transmits an attack detection result to another apparatus, this apparatus may execute the protection function.

1.1 Total Configuration of On-Board Network System 10

FIG. 1 is a diagram illustrating a total configuration of an on-board network system 10 according to a first embodiment.

The on-board network system 10 is an example of a network communication system which performs communication according to the CAN protocol and which is used in a vehicle in which various devices such as a control apparatus, a sensor, an actuator, and a user interface apparatus are installed. The on-board network system 10 includes a plurality of apparatuses configured to transmit and receive frames via a bus and executes the attack detection method.

More specifically, as illustrated in FIG. 1, the on-board network system 10 includes ECUs 100a to 100d installed in a vehicle and connected to various devices, buses 200a and 200b, and a gateway 300. Although the on-board network system 10 may further include many ECUs in addition to the gateway 300, the ECUs 100a to 100d, the following explanation will focus on the gateway 300 and the ECUs 100a to 100d. Each ECU is an apparatus which may include, for example, a digital circuit such as a processor (a microprocessor), a memory, and/or the like, an analog circuit, a communication circuit, and/or the like. The memory may be a ROM, a RAM, or the like and may store a control program (a computer program functioning as software) executed by the processor. For example, the processor operates in accordance with the control program (the computer program) such that the ECU realizes various functions. Note that, to realize a particular function, the computer program includes a plurality of instruction codes indicating instructions issued to the processor.

The ECUs 100a to 100d are respectively connected to devices such as an engine 101, a brake 102, a door open/close sensor 103, and a window open/close sensor 104. The ECUs 100a to 100d acquires states of the respective devices and periodically transmit frames (data frames) indicating the states over the on-board network including the bus 200a, the bus 200b, and the like.

The gateway 300 is a kind of an ECU functioning as a gateway apparatus connected to the bus 200a, to which the ECU 100a and the ECU 100b are connected, and the bus 200b, to which the ECU 100c and the ECU 100d are connected. The gateway 300 has a transfer function to transfer a frame received from one bus to the other bus. Furthermore, the gateway 300 has an attack detection function and thus the gateway 300 also operates as a security apparatus.

Each ECU in the on-board network system 10 transmits and receives frames according to the CAN protocol. Frames according to the CAN protocol include a data frame, a remote frame, an overload frame and an error frame.

1.2 Data Frame Format

The data frame which is one type of frames used in networks according to the CAN protocol is described below.

Figure 2:
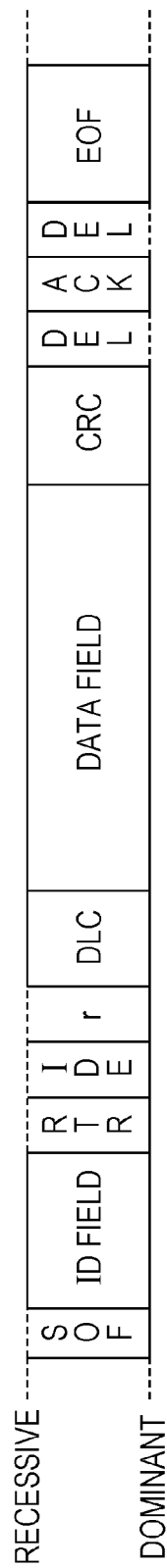
FIG. 2 is a diagram illustrating a data frame format according to the CAN protocol.

FIG. 2 a diagram illustrating a data frame format according to the CAN protocol. In the example illustrated in FIG. 2, the data frame is according to a standard ID format defined in the CAN protocol. The data frame includes, as fields, SOF (Start Of Frame), an ID field, RTR (Remote Transmission Request), IDE (Identifier Extension), a reserved bit "r", DLC (Data Length Code), a data field, a CRC (Cyclic Redundancy Check) sequence, a CRC delimiter "DEL", an ACK (Acknowledgement) slot, an ACK delimiter "DEL", and EOF (End Of Frame).

SOF includes a one dominant bit. When the bus is in an idle state, the SOF is in a recessive state. When transmission is started, the SOF is set to dominant thereby providing a notification of start of a frame.

The ID field is a field including 11 bits and storing an ID (a message ID) having a value indicating a data type. When a plurality of nodes start transmission at the same time, communication arbitration is performed according to ID fields such that a frame having a smaller ID value is given a higher priority.

RTR has a value identifying a data frame and a remote frame. In the case of a data frame, RTR has a 1 dominant bit.

IDE and "r" each have one dominant bit.

DLC includes 4 bits indicating a length of the data field. Note that IDE, "r", and DLC are collectively called a control field.

The data field has a value including up to 64 bits indicating a content of data to be transmitted. The length is allowed to be adjusted in units of 8 bits. The specification of the data to be transmitted is not defined in the CAN protocol but defined in the on-board network system 10. Therefore, the specification depends on a vehicle type, a manufacturer (a maker), or the like.

The CRC sequence includes 15 bits. The value thereof is calculated based on the transmission values of the SOF, the ID field, the control field, and the data field.

The CRC delimiter is a delimiter including one recessive bit indicating an end of the CRC sequence. Note that the CRC sequence and the CRC delimiter are collectively called a CRC field.

The ACK slot includes 1 bit. When a transmission node performs transmission, the ACK slot is set to recessive. When a reception node normally receives fields until the end of the CRC sequence, the reception node transmits a dominant ACK slot. Dominant bits are higher in priority than recessive bits. Therefore, when a dominant ACK slot is obtained after the transmission, the transmission node recognizes that the fields have been successfully received by some reception node.

The ACK delimiter is a delimiter including one recessive bit indicating an end of ACK.

EOF includes seven recessive bits to indicate an end of the data frame.

1.3 Configuration of Gateway 300

Figure 3:
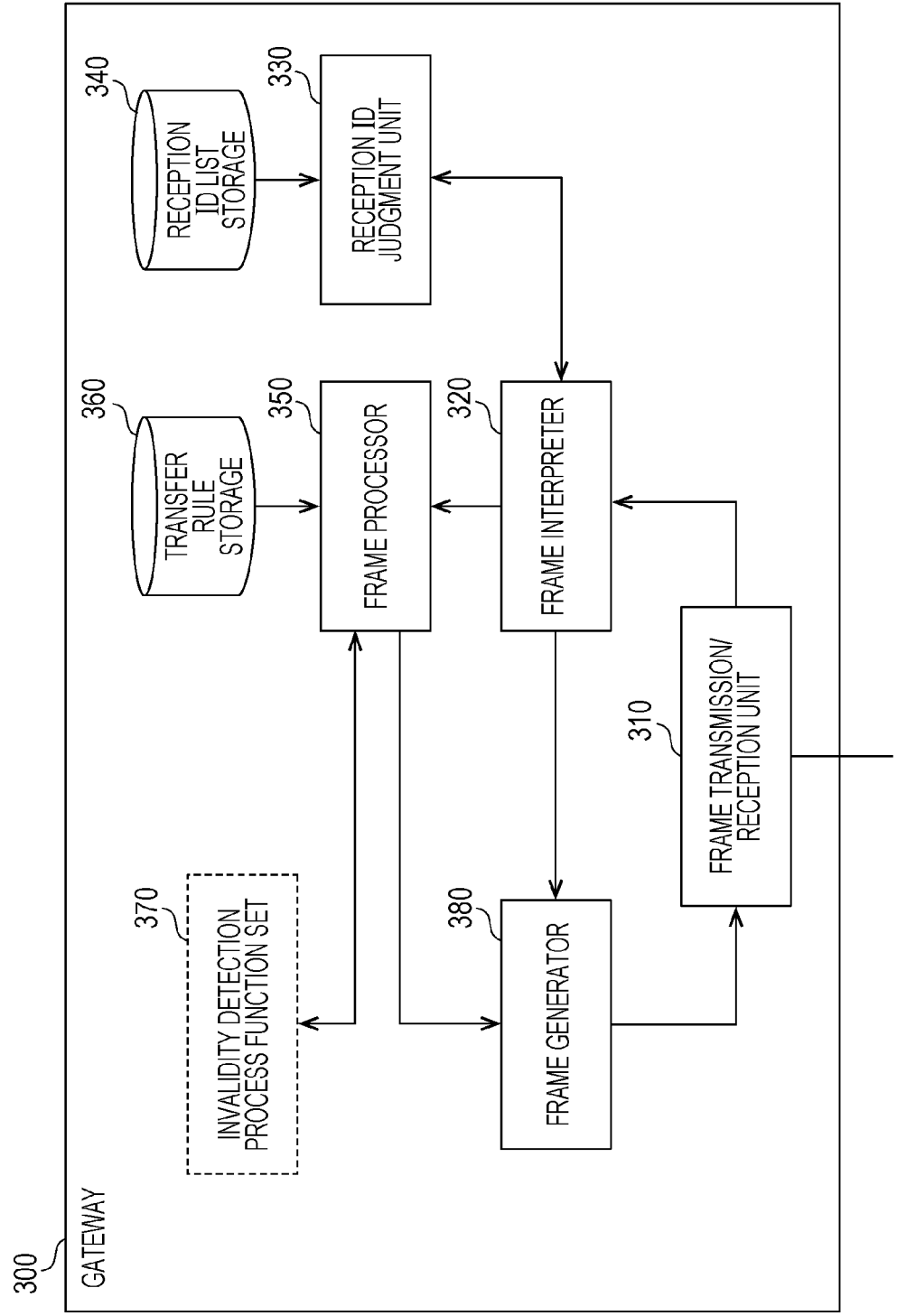
FIG. 3 is a diagram illustrating a configuration of a gateway according to the first embodiment.

FIG. 3 is a configuration diagram of the gateway 300. The gateway 300 executes a function (a transfer function) to transfer frames between buses, and the gateway 300 also functions as a security apparatus having an attack detection function. To achieve these functions, the gateway 300 includes, as illustrated in FIG. 3, a frame transmission/reception unit 310, a frame interpreter 320, a reception ID judgement unit 330, a reception ID list storage 340, a frame processor 350, a transfer rule storage 360, an invalidity detection process function set 370, and a frame generator 380. Each of these constituent elements is realized by a communication circuit in the gateway 300, a processor or a digital circuit that executes a control program stored in a memory, or the like.

The frame transmission/reception unit 310 transmits and receives, according to the CAN protocol, frames to and from the bus 200a and the bus 200b respectively. The frame transmission/reception unit 310 receives a frame on a bit-by-bit basis from the bus 200a or the bus 200b, and transfers the received frame to the frame interpreter 320. Furthermore, based on a frame and bus information indicating a destination bus received from the frame generator 380, the frame transmission/reception unit 310 transmits a content of the frame to the bus 200a or the bus 200b on a bit-by-bit basis.

The frame interpreter 320 receives values of the frame from the frame transmission/reception unit 310 and interprets the values such that the values are mapped to fields according to the frame format defined in the CAN protocol. As for a value determined to be mapped to the ID field, the frame interpreter 320 transfers the value to the reception ID judgement unit 330. According to a judgement result notified from the reception ID judgement unit 330, the frame interpreter 320 determines whether the value of the ID field and the data field (data) following the ID field are to be transferred to the frame processor 350 or the reception of the frame is to be stopped. In a case where the frame interpreter 320 judges that the frame is not according to the CAN protocol, the frame interpreter 320 notifies the frame generator 380 that an error frame is to be transmitted. In a case where the frame interpreter 320 receives an error frame, the frame interpreter 320 discards a following part of the frame being received, that is, the frame interpreter 320 stops the interpretation of the frame.

The reception ID judgement unit 330 receives the value of the ID field sent from the frame interpreter 320 and judges, according to a list of message IDs stored in the reception ID list storage 340, whether to receive fields following the ID field in the frame. The reception ID judgement unit 330 notifies the frame interpreter 320 of the determination result.

Figures 4, 5, 6:
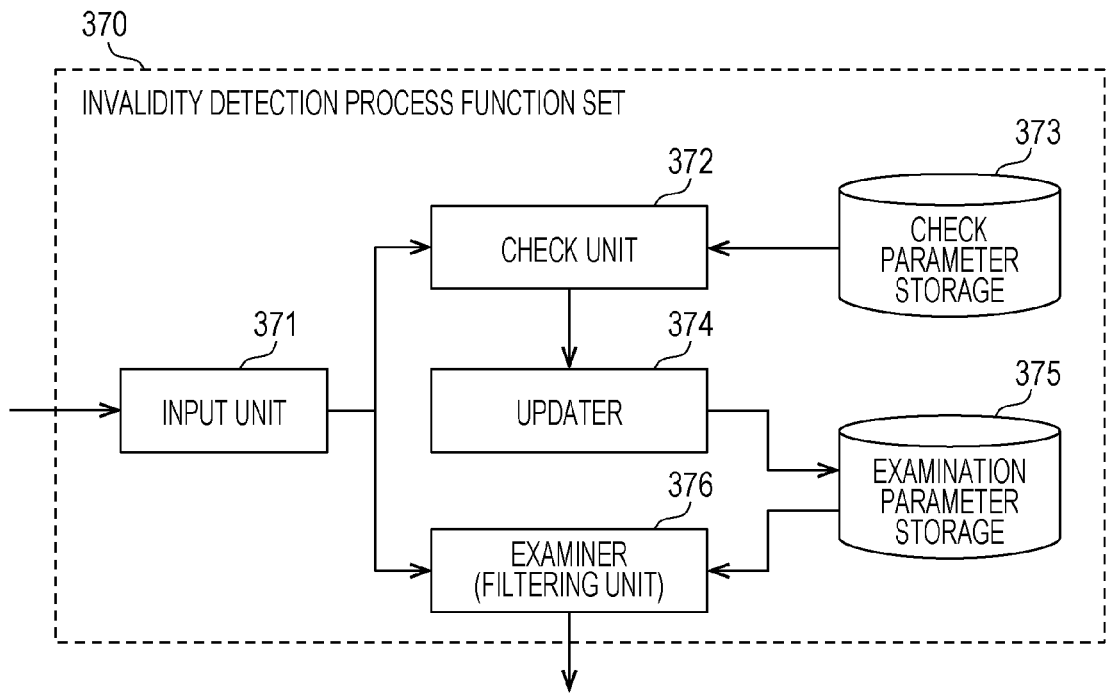
FIG. 4 is a diagram illustrating an example of a reception ID list.
FIG. 5 is a diagram illustrating an example of a transfer rule used by a gateway.
FIG. 6 is a configuration diagram of an invalidity detection process function set according to the first embodiment.

The reception ID list storage 340 stores a reception ID list which is a list of IDs (message IDs) that the gateway 300 receives. An example of a reception ID list will be described later (FIG. 4).

The frame processor 350 determines the transfer destination bus depending on the ID of the received frame according to the transfer rule stored in the transfer rule storage 360, and, to perform transferring of the frame, the frame processor 350 notifies the frame generator 380 of bus information associated with the transfer destination bus, the message ID notified from the frame interpreter 320, and the data. Furthermore, the frame processor 350 sends the frame (the message) received from the frame interpreter 320 to the invalidity detection process function set 370 and requests the invalidity detection process function set 370 to detect an attack (that is, judge whether the frame is an attack frame or not). In a case where the frame is judged as an attack frame by the invalidity detection process function set 370, the frame processor 350 stops the process for transferring the frame. That is, as one method of protection from attack frames, the frame processor 350 performs filtering for suppressing transferring, and transfer frames other than attack frames according to the transfer rule.

The transfer rule storage 360 stores the transfer rule which is information representing the rule in terms of frame transfer for each bus. An example of a transfer rule will be described later (FIG. 5).

The invalidity detection process function set 370 is a function set for realizing an attack detection function to judge whether a frame being received is an attack frame or not, that is, an invalid frame or not. Constituent elements of the invalidity detection process function set 370 will be described later.

In accordance with an error frame transmission request received from the frame interpreter 320, the frame generator 380 transfers an error frame to the frame transmission/reception unit 310 and forces the frame transmission/reception unit 310 to transmit the error frame. The frame generator 380 constructs a frame using the message ID and the data received from the frame processor 350 and sends the frame together with bus information to the frame transmission/reception unit 310.

1.4 Example of Reception ID List

FIG. 4 is a diagram illustrating an example of a reception ID list stored in the reception ID list storage 340 of the gateway 300.

The reception ID list illustrated by way of example in FIG. 4 is used to selectively receive and process a frame including a message ID whose value is one of "1", "2", "3", and "4". This is merely one example, but in the reception ID list, message IDs of frames to be received by the gateway 300 are described.

1.5 Example of Transfer Rule

FIG. 5 illustrates an example of a transfer rule stored in the transfer rule storage 360 of the gateway 300.

This transfer rule describes a correspondence among a transfer source bus, a transfer destination bus, and an ID (a message ID) to be transferred. In FIG. 5, "*" indicates that frame transmission is performed regardless of the message ID. In the example illustrated in FIG. 5, the rule is set such that a frame received from the bus 200*a* is transferred to the bus 200*b* regardless of the message ID. Furthermore, in this example, the rule is also set such that of frames received from the bus 200*b*, only frames having a message ID of "3" are transferred to the bus 200*a*.

1.6 Configuration of Invalidity Detection Process Function Set 370

FIG. 6 is a configuration diagram of the invalidity detection process function set 370. The invalidity detection process function set 370 includes an input unit 371, a check unit 372, a check parameter storage 373, an updater 374, an examination parameter storage 375, and an examiner (filtering unit) 376.

When the input unit 371 receives a request for attack detection from the frame processor 350, the input unit 371 sends a value of each field of a frame notified from the frame processor 350 (that is, the frame received by the gateway 300 from a bus) to both the check unit 372 and the examiner (the filtering unit) 376 and issues an instruction to perform a check and an examination (for example, an examination for filtering) on the frame.

The check unit 372 has a function of performing a judgement on a frame (a judgement, for example, as to whether the frame is an invalid frame or not) based on the content of the frame received from the input unit 371 by judging whether or not the frame (the frame received by the gateway 300 from a bus) satisfies a predetermined condition. The check unit 372 acquires a parameter (referred to as a check parameter) such as a threshold value or the like used in the judgement from the check parameter storage 373.

The check parameter storage 373 is realized, for example, in a part of an area of a storage medium such as a memory, and stores the check parameter (the threshold value or the like) used by the check unit 372.

Figure 7:
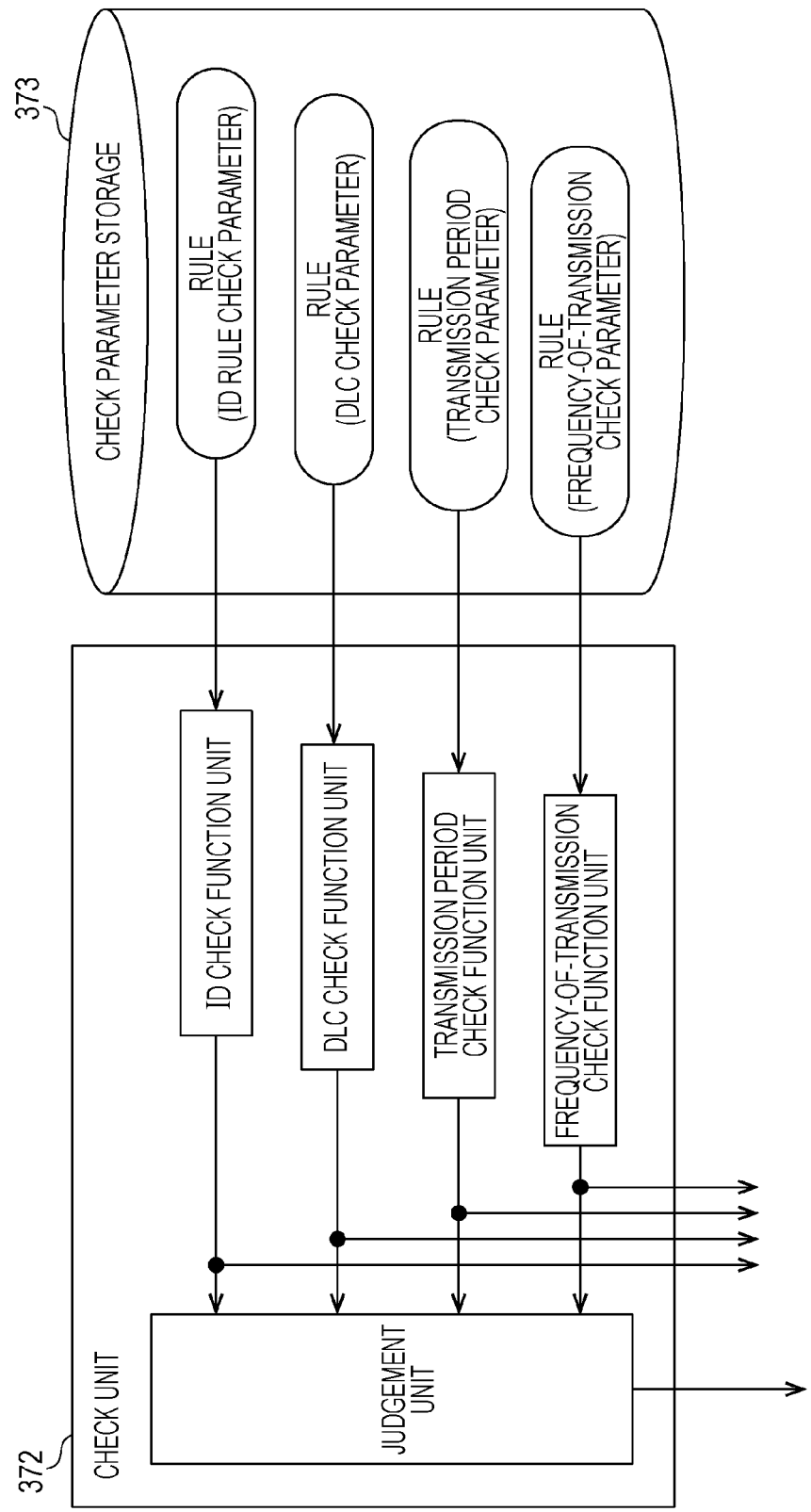
FIG. 7 is a diagram illustrating an example of a configuration of a check unit and a check parameter storage of an invalidity detection process function set.

FIG. 7 is a diagram illustrating an example of a configuration of the check unit 372 and that of the check parameter storage 373. In the example illustrated in FIG. 7, the check unit 372 includes an ID check function unit that provides a function (an ID check function) of judging whether a value of an ID of an ID field of a frame satisfies a predetermined condition, a DLC check function unit that provides a function (a DLC check function) of judging whether a value (a data length) of DLC of a frame satisfies a predetermined condition, a transmission period check function unit that provides a function (a transmission period check function) of judging whether a transmission period, which is a time interval between transmissions of two frames having equal ID values, satisfies a predetermined condition, and a frequency-of-transmission check function unit that provides a function (a frequency-of-transmission check function) of judging whether a predetermined condition is satisfied for a frequency of transmission indicating a frequency transmitting one or more frames with equal ID values in a predetermined unit time. Each check function unit in the check unit 372 illustrated in FIG. 7 acquires a rule (a condition identified by a check parameter) associated with the corresponding check function stored in the check parameter storage 373 and performs a check process according to the rule. The check parameters include an ID check parameter corresponding to the ID check function, a DLC check parameter corresponding to the DLC check function, a transmission period check parameter corresponding to the transmission period check function, and a frequency-of-transmission check parameter corresponding to the frequency-of-transmission check function. Furthermore, the check unit 372 illustrated in FIG. 7 outputs individually check results (judgement results indicating, for example, whether the predetermined conditions are satisfied or not) in the respective check function units, and also outputs a result obtained as a result of an overall judgment performed by a judgment unit on the check results of the respective check function units. For example, the judgment unit outputs a result of a logic operation (an operation including a combination of one or more of logical AND, logical OR, and the like) using the check results (for example, judgement results indicating whether the respectively conditions are satisfied or not satisfied) in the respective check function units.

The ID check function of the check unit 372 functions by way of example such that if the ID check parameters in the check parameter storage 373 include one or more message ID values, and if the message ID in the ID field transmitted to the check unit 372 from the input unit 371 is equal to one of the message IDs included in the ID check parameters, then the ID check function unit of the check unit 372 judges that the predetermined condition is satisfied. Conversely, for example, if the message ID in the ID field transmitted from the input unit 371 is not equal to any one of the message IDs included in the ID check parameters, the check unit 372 judges that the predetermined condition is not satisfied. As a result of the affirmative judgment in terms of the condition by the ID check function unit or the like of the check unit 372, for example, the updater 374 updates one of the examination parameters stored in the examination parameter storage 375.

The DLC check function of the check unit 372 functions by way of example such that if the DLC check parameters in the check parameter storage 373 include one or more DLC values, and if the DLC value transmitted to the check unit 372 from the input unit 371 is not equal to any one of the DLC values included in the DLC check parameters, then the DLC check function unit of the check unit 372 judges that the predetermined condition is satisfied. Conversely, for example, if the DLC value transmitted from the input unit 371 is equal to one of the DLC values included in the DLC check parameters, the check unit 372 judges that the predetermined condition is not satisfied. As a result of the affirmative judgment in terms of the condition by the DLC check function unit or the like of the check unit 372, for example, the updater 374 updates one of the examination parameters stored in the examination parameter storage 375.

The transmission period check function of the check unit 372 functions by way of example such that if the transmission period check parameters in the check parameter storage 373 includes a fixed range (for example, from 90 msec to 110 msec) of the time interval (period), and if the reception time interval between a present frame transmitted to the check unit 372 from the input unit 371 and a frame, that is an immediately previously received one of frames having the same message ID as that of the present frame, is out of the range of the period included in the transmission period check parameter, then the transmission period check function unit of the check unit 372 judges that the predetermined condition is satisfied. As a result of the affirmative judgment in terms of the condition by the transmission period check function unit or the like of the check unit 372, for example, the updater 374 updates one of the examination parameters stored in the examination parameter storage 375.

The frequency-of-transmission check function of the check unit 372 functions by way of example such that if the frequency-of-transmission check parameters in the check parameter storage 373 include a fixed upper limit of the frequency (threshold value), and if, as for a frame transmitted to the check unit 372 from the input unit 371, the frequency of transmission of the frame (the frequency of receiving the frame) is larger than the upper limit of the frequency included in the frequency-of-transmission check parameters, for example, represented by the number (for example, 100), for example, per unit time (for example 1 sec), then the frequency-of-transmission check function unit of the check unit 372 judges that the predetermined condition is satisfied. Note that the frequency-of-transmission check parameter may describe a lower limit of the frequency. If the frame is received a smaller number of times in the unit time than the lower limit, the check unit 372 may judge that the predetermined condition is satisfied. Note that the frequency-of-transmission check parameter may indicate a range (an upper limit and a lower limit) of the frequency. As a result of the affirmative judgment in terms of the condition by the frequency-of-transmission check function unit or the like of the check unit 372, for example, the updater 374 updates one of the examination parameters stored in the examination parameter storage 375. Note that the check unit 372 may output, every unit time, the judgement result made by the frequency-of-transmission check function, and the updater 374 may update the examination parameters in response to the output.

The check unit 372 may further include, for example, a data check function unit that provides a function (a data check function) of judging whether a predetermined condition is satisfied or not for a value of data of a data field of a frame. The data check function may include, for example, a fixed data value check function to check whether or not the value of the data is equal to a value specified by the check parameter. Furthermore, the data check function may include, for example, a data range check function to check whether the value of the data is within a range specified by the check parameter. Furthermore, the data check function may include, for example, a lower limit of data check function or an upper limit of data check function to check whether the value of the data is equal to or larger than or equal to or smaller than a value specified by the check parameter. Furthermore, the data check function may include, for example, a data operation result check function to check, for example, whether the value of the data is equal to a result of a particular operation specified by the check parameter. Note that the data to be subjected to the check by the data check function may be a whole data field, or part of one or more bits (which may or may not be successive) of a data field.

Each check function described above may be applied regardless of the message ID, or may be applied only to a frame having a specific message ID. Note that the check functions of the check unit 372 described above are merely examples, and the check functions are not limited to those examples. The check unit 372 may include a check function other than those described above or may use only part of the plurality of check functions described above.

In response to receiving the judgement result from the check unit 372, the updater 374 determines, according to the judgement result, for example, an examination parameter (a threshold value or the like) to be updated of the plurality of examination parameters in the examination parameter storage 375, and the updater 374 updates the determined examination parameter. The examination parameter updated by the updater 374, the frequency of updating of the examination parameter, and the like are determined according to a predetermined criterion, algorithm, and the like. The criterion, the algorithm, and the like are determined, for example, when the gateway 300 is produced.

The examination parameter storage 375 is realized, for example, in a part of an area of a storage medium such as a memory, and stores the examination parameters (threshold values or the like) used by the examiner 376.

The examiner 376 performs an examination, based on the examination parameters stored in the examination parameter storage 375, as to whether a frame transmitted from the input unit 371 (a frame received from a bus) is an attack frame or not). The examination performed by the examiner 376 in terms of the judgement as to whether the frame is an attack frame or not is a basis of protection functions such as filtering of frames, and the examiner 376 is capable of functioning as a filtering unit that performs, for example, an examination for filtering. The examiner 376 acquires, from the examination parameter storage 375, the examination parameter defining the threshold value or the like used in judging whether the frame is an attack frame or not. As described above, the examination parameter is updated as required by the updater 374.

Figure 8:
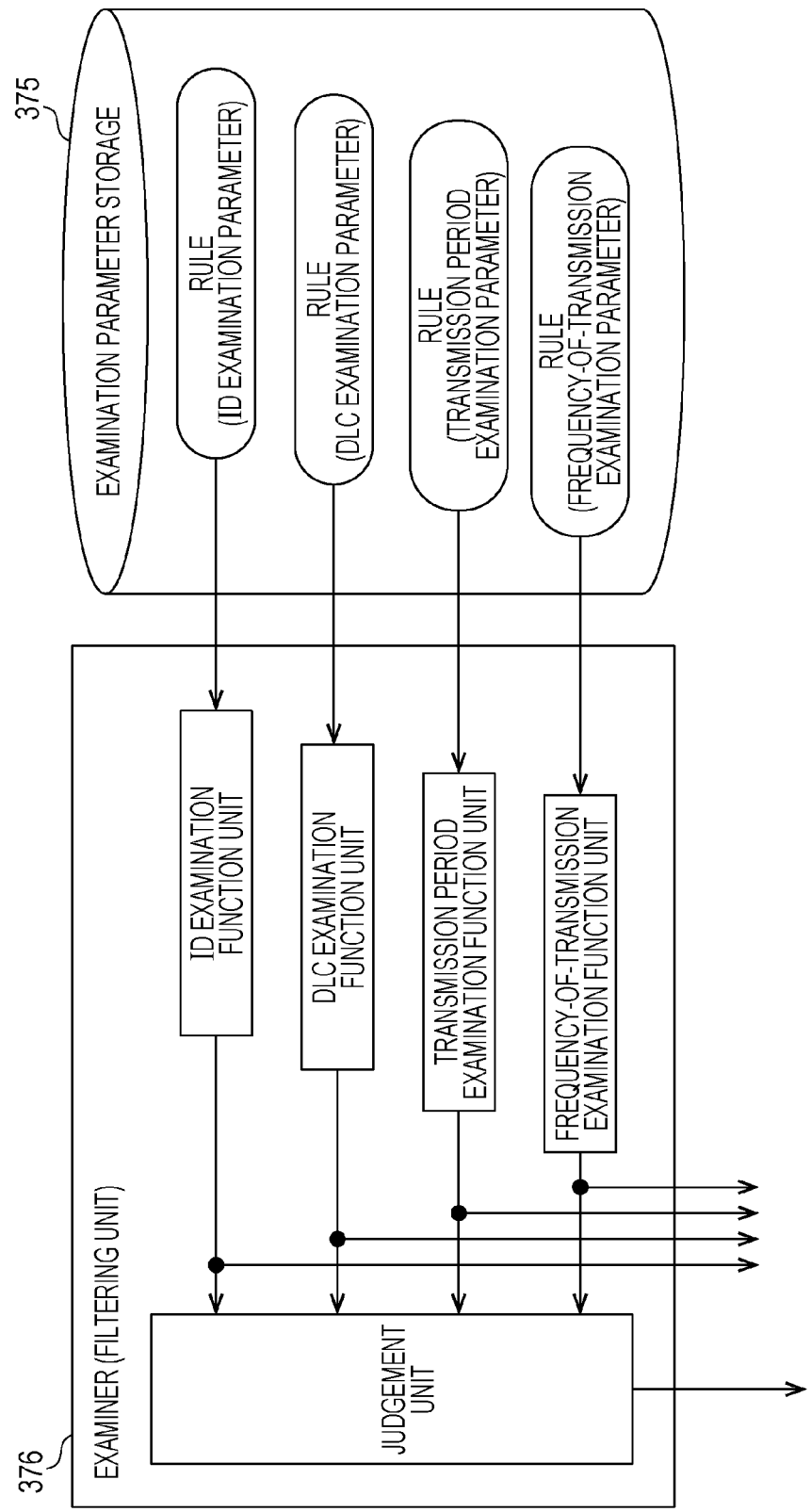
FIG. 8 is a diagram illustrating an example of an examiner (a filtering unit) and an examination parameter storage of an invalidity detection process function set.

FIG. 8 illustrates an example of a configuration of the examiner 376 and that of the examination parameter storage 375. In the example illustrated in FIG. 8, the examiner 376 includes an ID examination function unit that provides a function (an ID examination function) of judging whether a value of an ID of an ID field of a frame satisfies a condition identified by an examination parameter, a DLC examination function unit that provides a function (a DLC examination function) of judging whether a value (a data length) of DLC of a frame satisfies a condition identified by an examination parameter, a transmission period examination function unit that provides a function (a transmission period examination function) of judging whether a condition identified by an examination parameter is satisfied for a transmission period indicating a time interval between transmissions of two frames with equal values of the ID, and a frequency-of-transmission examination function unit that provides a function (a frequency-of-transmission examination function) of judging whether a condition identified by an examination parameter is satisfied for a frequency of transmission indicating a frequency of transmitting one or more frames with equal ID values in a predetermined unit time. Each examination function unit in the examiner 376 illustrated in FIG. 8 acquires a rule (a condition identified by an examination parameter) associated with the corresponding examination function stored in the examination parameter storage 375. The examination parameters include an ID examination parameter corresponding to the ID examination function, a DLC examination parameter corresponding to the DLC examination function, a transmission period examination parameter corresponding to the transmission period examination function, and a frequency-of-transmission examination parameter corresponding to the frequency-of-transmission examination function. The examiner 376 illustrated in FIG. 8 outputs a result obtained as a result of an overall judgment performed by a judgment unit on the examination results of the respective examination function units.

The ID examination function of the examiner 376 functions by way of example such that if the ID examination parameters in the examination parameter storage 375 include one or more message ID values, and if a message ID in an ID field transmitted to the examiner 376 from the input unit 371 is equal to one of the message IDs included in the ID examination parameters, then the ID examination function unit of the examiner 376 judges that a frame is an attack frame. Conversely, for example, if the message ID in the ID field transmitted from the input unit 371 is not equal to any one of the message IDs included in the ID examination parameters, the examiner 376 judges that the frame is not an attack frame. For example, if the frame is judged as an attack frame by one of the examination function units such as the ID examination function unit of the examiner 376, then, as a result of the judgement, the examiner 376 outputs information indicating that the frame is the attack frame.

The DLC examination function of the examiner 376 functions by way of example such that if the DLC examination parameters in the examination parameter storage 375 include one or more DLC values, and if the DLC value transmitted to the examiner 376 from the input unit 371 is not equal to any one of the DLC values included in the DLC examination parameters, the DLC examination function unit of the examiner 376 judges that the frame is an attack frame. Conversely, for example, if the DLC value transmitted from the input unit 371 is equal to one of the DLC values included in the DLC examination parameters, the examiner 376 judges that the frame is not an attack frame. For example, in a case where the DLC value received from the input unit 371 is greater than the DLC value included in the DLC examination parameter, the examiner 376 may judge that the frame is an attack frame, or in a case where the DLC value received from the input unit 371 is smaller than the DLC value included in the DLC examination parameter, the examiner 376 may judge that the frame is an attack frame. The rule of the judgement may be defined, for example, in the examination parameter.

The transmission period examination function of the examiner 376 functions by way of example such that if the transmission period examination parameter in the check parameter storage 375 includes a fixed range (for example, from 90 msec to 110 msec) of the time interval (period), and if the reception time interval between a frame transmitted to the examiner 376 from the input unit 371 and a frame, that is an immediately previously received one of frames having the same message ID as that of the present frame, is out of the range of the period included in the transmission period examination parameter, the transmission period examination function unit of the examiner 376 judges that the frame is an attack frame. For example, in a case where the reception time interval between two frames having the same message ID is greater than or small than a threshold value, the examiner 376 may judge that the frames are attack frames. To this end, the threshold value may be described in the transmission period examination parameter, and the transmission period examination parameter may include a description of rule defining what condition is to be satisfied to judge that the fame is an attack frame.

The frequency-of-transmission examination function of the examiner 376 functions by way of example such that if the frequency-of-transmission examination parameters in the examination parameter storage 375 include a fixed upper limit of the frequency (threshold value), and if, regarding a frame transmitted to the examiner 376 from the input unit 371, the frequency of the transmitted frame (the frequency of receiving the frame) is larger than the upper limit of the frequency included in the frequency-of-transmission examination parameters, for example, represented by the number (for example, 100), for example, per unit time (for example 1 sec), the frequency-of-transmission examination function unit of the examiner 376 judges that the frame is an attack frame.

The examiner 376 may further include, for example, a data examination function unit that provides a function (data examination function) of judging whether the frame is an attack frame or not depending on whether a condition identified by an examination parameter is satisfied or not for a value of data of a data field of the frame. The data examination function may include, for example, a fixed data value examination function unit to determine whether the frame is an attack frame or not by examining whether or not the value of the data is a value specified by the check parameter. Furthermore, the data examination function may include, for example, a data range examination function to examine whether the value of the data is within a range specified by an examination parameter, and a lower limit of data examination function or an upper limit of data examination function to examine whether the value of the data is equal to or larger than or equal to or smaller than a value specified by an examination parameter. The data examination function may include a range of change in data examination function to examine whether an amount of difference in value of data between a present frame and a frame, that is an immediately previously received one of frames having the same message ID as that of the present frame, is within a range specified by an examination parameter. The data examination function may include, for example, a data operation result examination function to examine whether a value of data is equal to a result of a particular operation specified by an examination parameter. Note that the data to be subjected to the examination by the data examination function may be a whole data field, or only part of one or more bits (which may or may not be successive) of a data field. Furthermore, the examination parameter may include a definition of a position in a data field at which data is subjected to the examination.

Each examination function described above may be applied regardless of the message ID, or may be applied only to a frame having a specific message ID. The above-described examination functions of the examiner 376 are merely examples, and the examination functions are not limited to those examples. The examiner 376 may include an examination function other than those described above or may use only part of the plurality of examination functions described above. The check unit 372 and the examiner 376 respectively may have check functions and examination functions for similar conditions, or may have check functions and examination functions for different conditions.

As an example of a method of updating an examination parameter by the updater 374, when the transmission period check function unit of the check unit 372 judges that the transmission period is out of a predetermined correct range and thus a condition is satisfied, the updater 374 lowers an upper limit (a threshold value) of the frequency in the frequency-of-transmission examination parameter stored in the examination parameter storage 375.

In a case where the examiner 376 includes the range of change in data examination function described above, a method of updating an examination parameter by the updater 374 is, for example, such that in a case where the transmission period check function unit of the check unit 372 judges that the transmission period is out of the predetermined correct range and thus a condition is satisfied, the range specified by a parameter, in examination parameters, associated with the range of change in data examination function is narrowed. In a case where the transmission period check function unit judges that the condition is satisfied, there is a possibility that an attack is being received, and thus limiting the allowable range of the change in data value to a narrower range is also useful to improve the attack detection rate. Furthermore, limiting the allowable range of the change in data value to a narrower range also provides an effect of reducing an influence of an attack.

Another method of updating an examination parameter by the updater 374 is such that in a case where the frequency-of-transmission check function unit of the check unit 372 judges that the value of the frequency is not equal a to proper value predetermined for each message ID by the frequency-of-transmission check function and thus a condition is satisfied, threshold values associated with various examination functions are changed so as to further increase the degree to which a frame is judged as an attack frame. The degree to which a frame is judged as an attack frame may be further increased, for example, by narrowing the range (the proper range) of the period in transmission period examination parameters stored in the examination parameter storage 375. In this example, when an increase occurs in the frequency of transmission of a frame with a certain message ID, there is a possibility that the frame is an attack frame, and thus, for safety, the range of the period is narrowed to make it possible to more securely detect attacks.

In a case where the frequency-of-transmission check function judges that the frequency of transmission is not equal to a predetermined proper value for all frames regardless of the message IDs, and thus a condition is satisfied, a method may be executed to widen the range of the period in transmission period examination parameters stored in the examination parameter storage 375. This method is one of methods of handling a situation in which when an increase in the frequency of frame transmission occurs, there occurs a possibility that a frame and another frame are tried to be transmitted at the same time, and thus a transmission arbitration occurs, which may result in a delay in transmission.

The examination parameters stored in the examination parameter storage 375 may include a parameter specifying one or more examination functions, in the plurality of examination functions possessed by the examiner 376, to be executed, and the updater 374 may, by way of example, employ an examination parameter update method in which the parameter specifying the examination function to be executed by the examiner 376 is updated depending on a result in the check unit 372.

The examination parameters stored in the examination parameter storage 375 may include a parameter specifying an order in which the plurality of examination functions are executed by the examiner 376, and the updater 374 may, by way of example, employ an examination parameter update method in which the parameter specifying the order in which the plurality of examination functions are executed by the examiner 376 is updated depending on a result in the check unit 372. For example, in the examiner 376 that executes the plurality of examination functions according to the parameter specifying the execution order, when any one of the plurality of examination functions judges that a received frame is an attack frame, it is allowed to stop execution of any examination function whose execution is not yet completed.

In another examination parameter update method employable by the updater 374, in a case where the transmission period check function unit of the check unit 372 judges that the frequency is out of the predetermined proper range and thus a condition is satisfied and the data range check function judges that the range of data is out of the predetermined proper range and thus a condition is satisfied, the range of the period in transmission period examination parameters stored in the examination parameter storage 375 may be narrowed. As in this case, an examination parameter may be updated according to results of a plurality of check functions. In the examination parameter update, only a parameter associated with one examination function may be updated, or parameters associated with a plurality of examination functions may be updated.

It is assumed above that in the examination parameter update method employed by the updater 374, when a condition predetermined using a check parameter by the check unit 372 is satisfied, an examination parameter is updated. However, conditions (that is, conditions for the update) are not limited to those that are satisfied when a received frame is an unauthorized attack frame or when the frame includes an abnormal part. For example, a condition may be such one that is satisfied when a received frame is a valid frame or the frame is partially valid. For example, in a case where it is determined that a condition is satisfied when the transmission period check function of the check unit 372 judges that a received frame is valid, the updater 374 may update a parameter, in the examination parameters, specifying an upper limit of data examination function or a lower limit of data examination function as the examination function to be executed by the examiner 376, or the updater 374 may update a parameter associated with the upper limit of data examination function or the lower limit of data examination function.

The above-described methods of updating examination parameters employed by the updater 374 are merely examples, and other methods of updating may be employed or only part of the methods of updating described above may be employed.

1.7 Configuration ECU 100a

Figure 9:
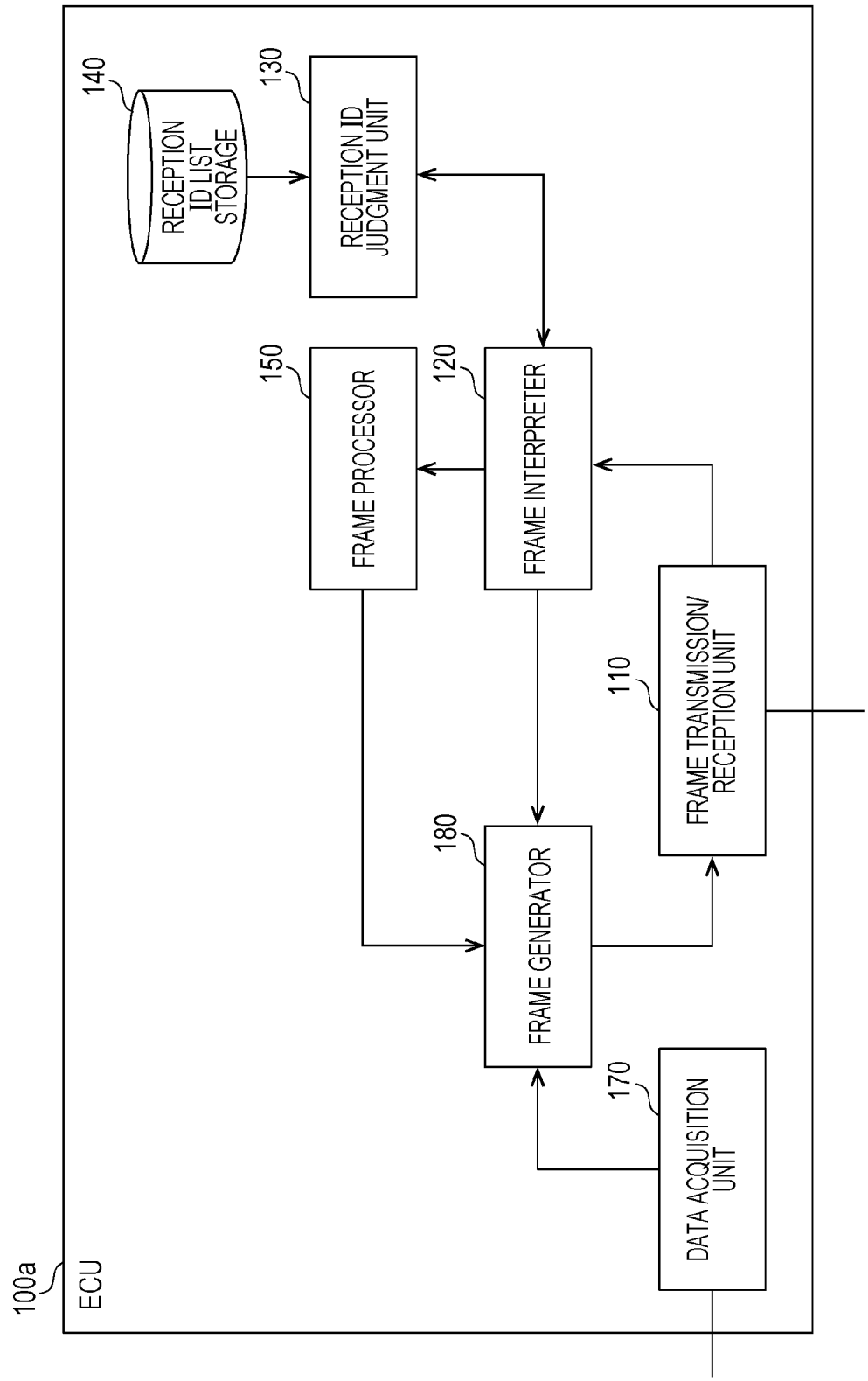
FIG. 9 is a configuration diagram of an ECU according to the first embodiment.

FIG. 9 is a configuration diagram of the ECU 100a. The ECU 100a includes a frame transmission/reception unit 110, a frame interpreter 120, a reception ID judgement unit 130, a reception ID list storage 140, a frame processor 150, a data acquisition unit 170, and a frame generator 180. Each of these constituent elements is realized by a communication circuit in the ECU 100a or a processor or a digital circuit or the like that executes a control program stored in a memory. The ECUs 100b to 100d each have a configuration basically similar to the configuration of the ECU 100a.

The frame transmission/reception unit 110 transmits and receives frames to or from the bus 200a according to the CAN protocol. A frame is received from the bus 200a on a bit-by-bit basis and transferred to the frame interpreter 120. Furthermore, a content of the frame notified from the frame generator 180 is transmitted to the bus 200a.

The frame interpreter 120 receives values of the frame from the frame transmission/reception unit 110 and interprets such that the values are mapped to fields according to the frame format defined by the CAN protocol. A value determined to be mapped to an ID field is transferred to the reception ID judgement unit 130. According to a judgement result notified from the reception ID judgement unit 130, the frame interpreter 120 determines whether the value of the ID field and data fields appearing following the ID field are to be transferred to the frame processor 150 or receiving of frames is to be stopped after the judgement result is received. In a case where a frame is judged, by the frame interpreter 120, as a frame that is not according to the CAN protocol, the frame interpreter 120 notifies the frame generator 180 that an error frame is to be transmitted. In a case where an error frame is received, the frame interpreter 120 discards the frame thereafter, that is, the frame interpreter 120 stops the frame interpretation.

The reception ID judgement unit 130 receives the value of the ID field notified from the frame interpreter 120 and determines, according to the list of message IDs stored in the reception ID list storage 140, whether each field of frames following the ID field is to be received or not. A judgement result is notified from the reception ID judgement unit 130 to the frame interpreter 120.

The reception ID list storage 140 stores a reception ID list that is a list of message IDs to be received by the ECU 100a. This reception ID list is similar, for example, to the example illustrated in FIG. 4.

The frame processor 150 performs different processes depending on ECUs according to data of a received frame. For example, the ECU 100a connected to the engine 101 has a function of generating an alarm sound when the vehicle runs at a speed higher than 30 km/hour with a door being in an open state. The frame processor 150 of the ECU 100a manages data (for example, in formation indicating the door state) received another ECU, and performs a process of generating an alarm sound under a certain condition according to the speed per hour acquired from the engine 101. The ECU 100c has a function of sounding an alarm when a door is opened in a state in which brake is not applied. The ECUs 100b and 100d do nothing. Note that the ECUs 100a to 100d may have a function other than the functions described above.

The data acquisition unit 170 acquires data indicating a state of a device connected to an ECU and data indicating a state of a sensor or the like, and notifies the frame generator 180 of the states.

The frame generator 180 constructs an error frame according to an error frame transmission command given by the frame interpreter 120, and supplies the error frame to the frame transmission/reception unit 110 and controls the frame transmission/reception unit 110 to transmit the error frame. Furthermore, the frame generator 180 constructs a frame such that a predetermined message ID is attached to a data value notified from the data acquisition unit 170, and supplies the resultant frame to the frame transmission/reception unit 110.

1.8 Attack Detection Process by Invalidity Detection Process Function Set

Figure 10:
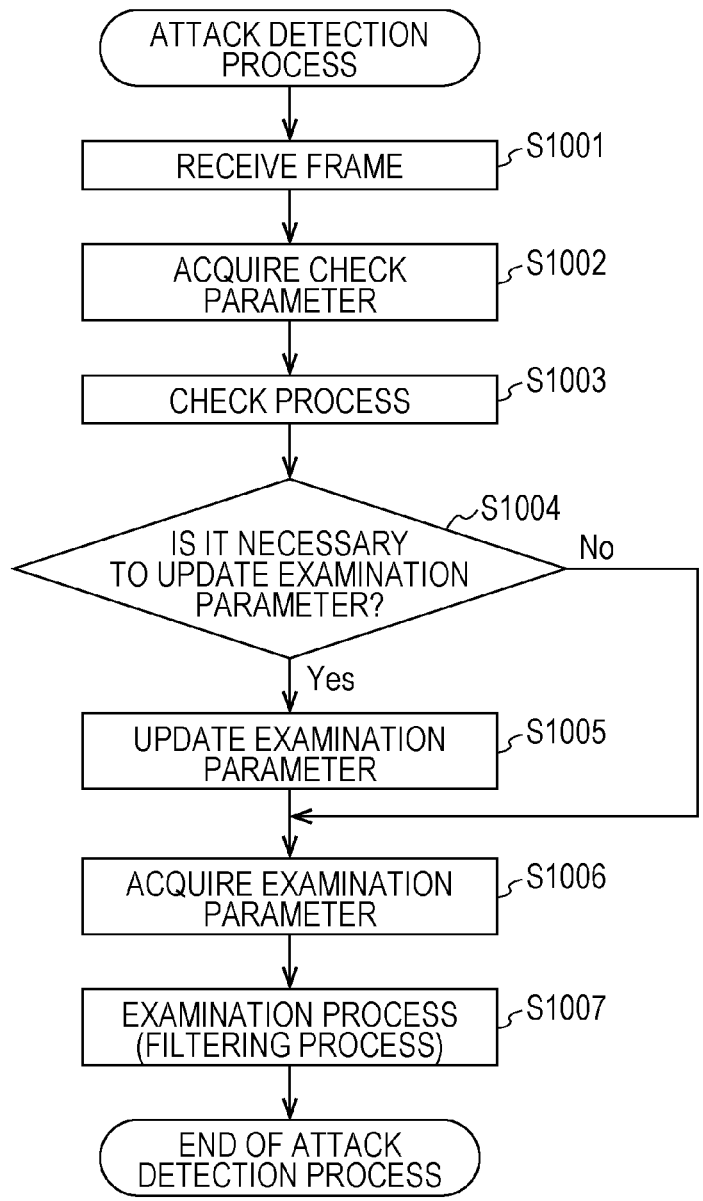
FIG. 10 is a flow chart illustrating an example of an attack detection process performed by an invalidity detection process function set.

FIG. 10 is a flow chart illustrating an example of an attack detection process performed by the invalidity detection process function set 370.

First, the input unit 371 receives each field data of a frame from the frame processor 350 (step S1001). The input unit 371 supplies each received field data to the check unit 372 and the examiner (the filtering unit) 376.

Next, the check unit 372 acquires a check parameter from the check parameter storage 373 (step S1002).

The check unit 372 then performs a check process to judge, using the acquired check parameter, whether a predetermined condition is satisfied or not (step S1003). The check unit 372 notifies the updater 374 of a result of the judgement by the check process (step S1003). In a case where the check unit 372 performs the judgement, in the check process, in terms of each of a plurality of conditions, the check unit 372 provides a notification of a judgement result in terms of each condition and also a notification of a result of an overall judgement based on the judgement result in terms of each condition.

The updater 374 judges, from the judgement result notified from the check unit 372, whether it is necessary or not to update an examination parameter stored in the examination parameter storage 375 (step S1004).

In a case where the updater 374 determines in step S1004 that it is necessary to update the examination parameter, the updater 374 updates the examination parameter in the examination parameter storage 375 (step S1005).

After the update in step S1005 is performed or in a case where it is determined in step S1004 that it is unnecessary to perform the examination parameter update, the examiner 376 acquires an examination parameter (for example, a parameter used in filtering) from the examination parameter storage 375 (step S1006).

Thereafter, the examiner 376 performs an examination process (for example, a filtering process based on which filtering is performed) (step S1007). By this examination process, the examiner 376 judges whether the received frame is an attack frame or not, and notifies the frame processor 350 of a judgement result. In a case where the examiner 376 judges that the received frame is an attack frame, the examiner 376 notifies the frame processor 350 that the received frame is the attack frame. The frame processor 350 performs filtering to disable a transfer process such that the attack frame is disabled.

1.9 Example of Operation of Gateway

Figure 11:
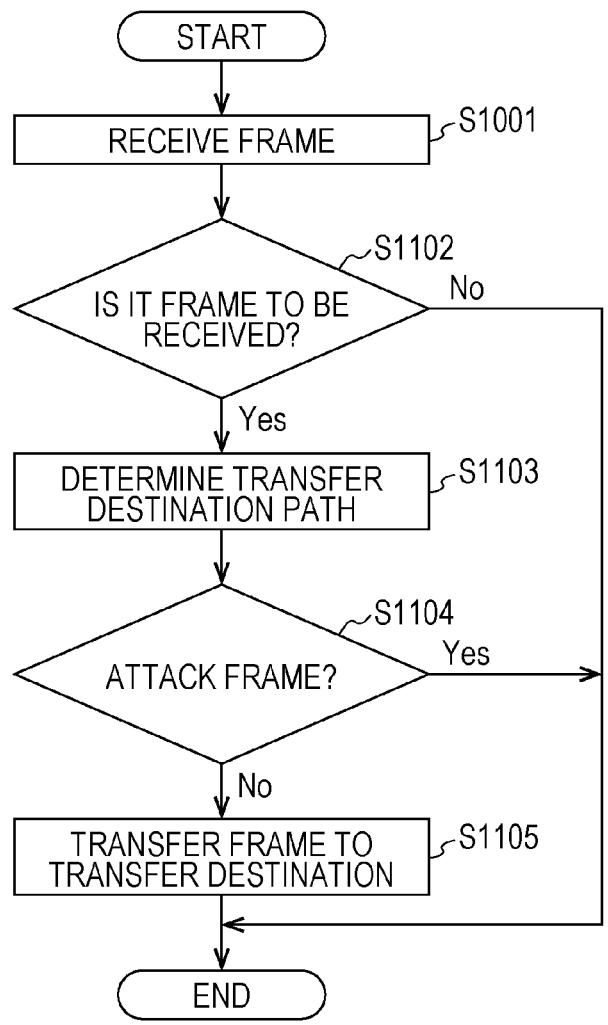
FIG. 11 is a flow chart illustrating an example of an operation (a transfer process) of a gateway.

FIG. 11 is a flow chart illustrating an example of an operation (a transfer process) of the gateway 300. The gateway 300 performs a transfer process to transfer a frame received from one bus to the other bus. The transfer process is assumed here by way of example to be performed such that a frame received from the bus 200a is transferred to the bus 200b. However, the process is similar also in a case where a frame received from the bus 200b is transferred to the bus 200a.

First, the frame transmission/reception unit 310 of the gateway 300 receives a frame from the bus 200a (step S1101). The frame transmission/reception unit 310 supplies data of each field of the received frame to the frame interpreter 320.

Next, the frame interpreter 320 of the gateway 300 makes a judgement based on a value of the ID field (a message ID) of the received frame, in cooperation with the reception ID judgement unit 330, as to whether it is necessary to receive and process the frame (step S1102).

In a case where it is determined in step S1102 that it is necessary to receive and process the frame, the frame interpreter 320 of the gateway 300 notifies the frame processor 350 of a value of each field in the frame. Thereafter, the frame processor 350 determines a transfer destination bus according to the transfer rule stored in the transfer rule storage 360 (step S1103).

The frame processor 350 of the gateway 300 requests the invalidity detection process function set 370 to perform an attack detection (a judgment as to whether the frame is an attack frame) by notifying the invalidity detection process function set 370 of a value of each field in the frame.

The invalidity detection process function set 370 of the gateway 300 performs the above-described attack detection process to determine, from the value of each field of the frame notified from the frame processor 350, whether the frame is an attack frame or not (step S1104), and the invalidity detection process function set 370 notifies the frame processor 350 of a result of the judgement.

In a case where it is determined in step S1104 that the frame is not an attack frame, the frame processor 350 of the gateway 300 requests the frame generator 380 to transfer the frame to the transfer destination bus determined in step S1103. In response to the request from the frame processor 350, the frame generator 380 transfer the frame to the specified transfer destination (step S1105). In step S1105, the frame processor 350 sends the value of each field of the frame to the frame generator 380. In response, the frame generator 380 realizes the transmission of the frame by generating the frame and controlling the frame transmission/reception unit 310 to transmit the frame to the bus 200b.

Note that although in the example described above, the determination as to whether the frame is an attack frame or not is performed (in step S1104) after the transfer destination is determined (in step S1103), the processing order is not limited to the example described above. The determination of the transfer destination (step S1103) may be performed after the determination of whether the frame is an attack frame or not (step S1104) is performed, or, for example, the determination of the transfer destination (step S1103) and the determination of whether the frame is an attack frame or not (step S1104) may be performed at the same time.

1.10 Effects of First Embodiment

In the on-board network system 10 according to the first embodiment, the invalidity detection process function set 370 performs the attack detection process for the filtering in the transfer process in which the gateway 300 transfers a frame. In the attack detection process, an examination parameter used in examining whether a frame is an attack frame or not may be changed by the check function depending on the received frame under a particular condition. This may result in an increase in a degree (detection accuracy) to which attack frames are properly detected adaptively to a wide variety of variable attacks. The increase in attack frame detection accuracy makes it possible to properly protect from attacks (possible to perform a process such as disabling of transferring to reduce an effect of attack frames on ECUs).

1.11 Modifications of First Embodiment

In the gateway 300 described above, the frame processor 350 requests the invalidity detection process function set 370 to perform an attack detection (the judgement in terms of whether a frame is an attack frame or not). Depending on a result of the judgement, the frame is transferred or not transferred thereby protecting from an attack frame. The method of use of the result of the attack detection is not limited to filtering in terms of whether the frame is to be transferred or not. As an example of a modification of the gateway 300 in the on-board network system 10, a gateway 300a is described below. In this gateway 300a, a result of attack detection is used to protect from an attack frame by disabling the attack frame.

Figure 12:
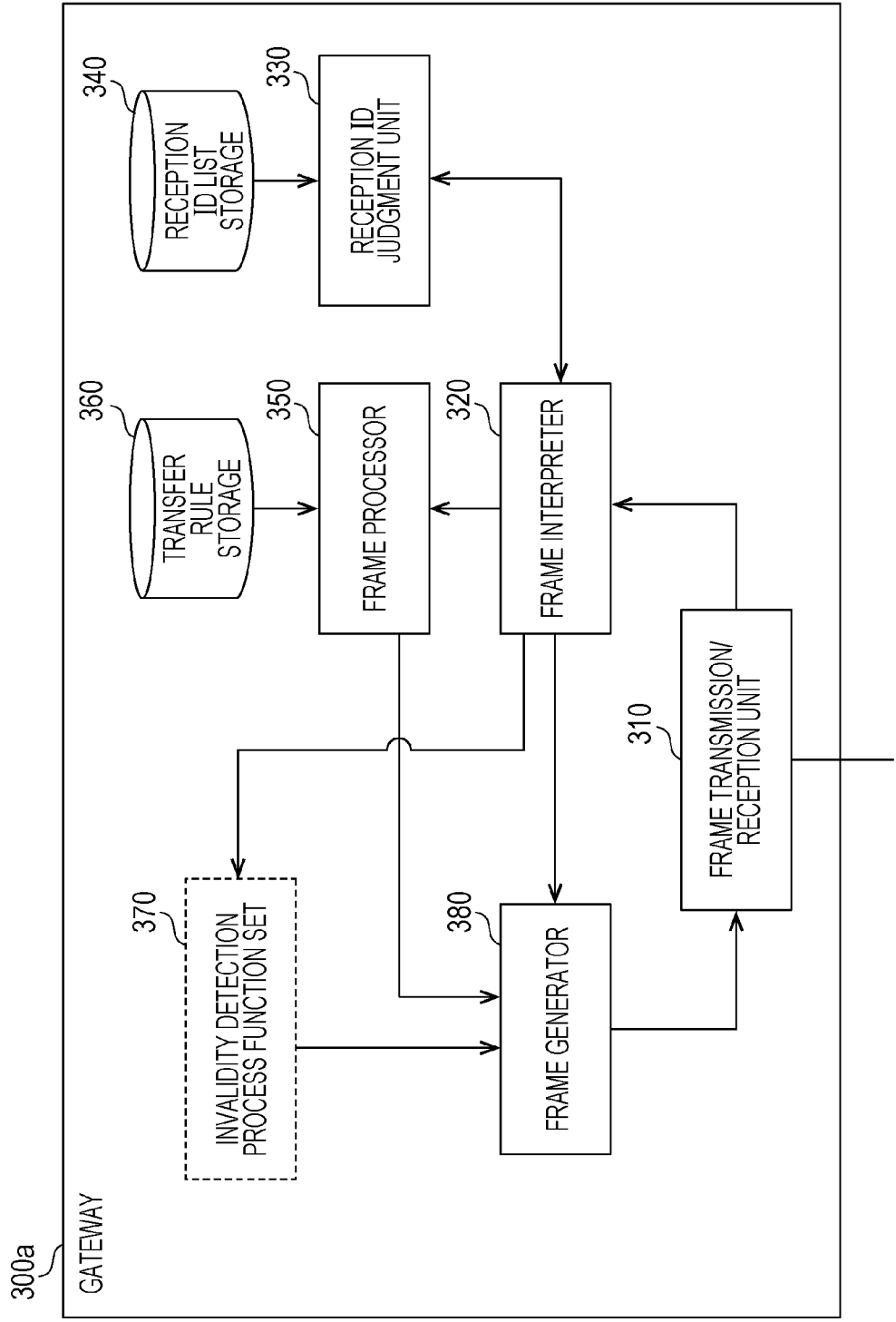
FIG. 12 is a configuration diagram of a gateway according to a modification of the first embodiment.

FIG. 12 a configuration diagram of the gateway 300a according to the modification of the first embodiment. In the gateway 300a, as illustrated in FIG. 12, a frame interpreter 320 sends each field of a received frame to an invalidity detection process function set 370. In a case where an examiner (a filtering unit) 376 of the invalidity detection process function set 370 judges that the frame is an attack frame, the examiner 376 requests a frame generator 380 to transmit an error frame thereby disabling the frame. To this end, the examiner 376 in the invalidity detection process function set 370 performs an examination in terms of determining whether the frame is an attack frame or not, after receiving an ID field of the frame receive by the gateway 300a and before receiving a part (a CRC field) following a data field. At a point of time at which the examiner 376 judges that the frame is an attack frame, the frame generator 380 and the frame transmission/reception unit 310 operate such that an error frame is transmitted to the bus to which the attack frame has been transmitted. As a result, a part of the attack frame at a position before the CRC field is overwritten by the error frame, which makes it possible to prevent each ECU from regarding the attack frame as a valid frame and operating in response to the attack frame. To prevent each ECU from regarding an attack frame as a valid frame and operating in response to the attack frame, it is sufficient to start transmitting the error frame before a last bit of EOF indicating an end of a data frame of the attack frame is transmitted. Therefore, it is allowed to arbitrarily adjust the timing of starting the transmission of the error frame. Note that the examination as to whether the frame is an attack frame or not may by performed at an early stage during the transmission of the frame, and the error frame transmission may start early when it is determined that the frame is an attack frame. This may be useful for a reduction in processing load associated with a CRC check or the like performed by each ECU to detect an attack frame.

Note that the frame interpreter 320 in the gateway 300a may send all frames to the invalidity detection process function set 370. Alternatively, the frame interpreter 320 may send only frames that are not included in the reception ID list to the invalidity detection process function set 370. As for frames included in the reception ID list, the frame processor 350 may request the invalidity detection process function set 370 to perform the attack detection.

Furthermore, as for a method of using the result of attack detection, attack frames may be subjected to both filtering for suppressing transferring of the frames between buses and disabling by transmitting an error frame to a bus to which each attack frame has been transmitted.

Figure 13:
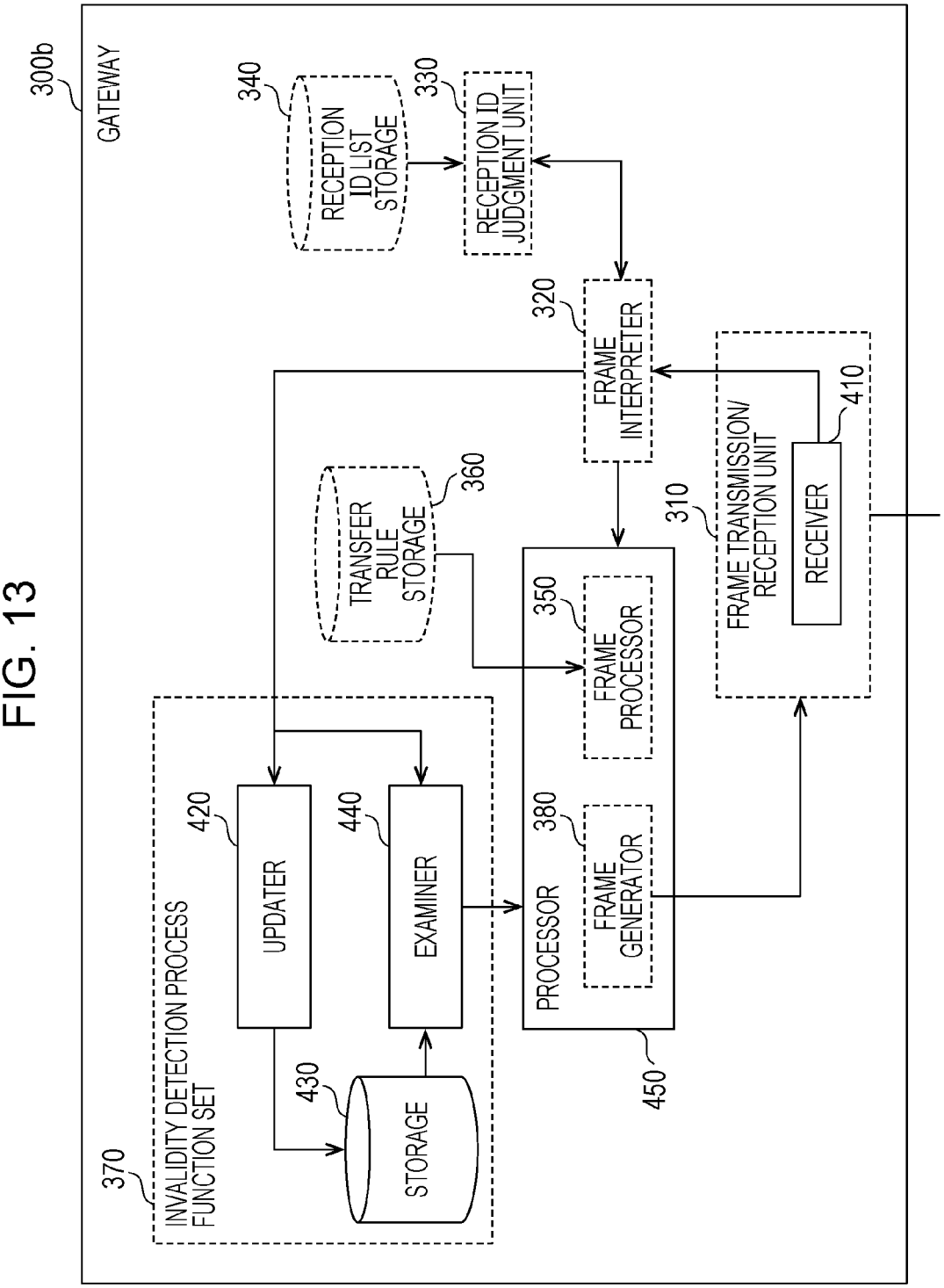
FIG. 13 is a block diagram illustrating a configuration of a gateway associated with attack detection according to the first embodiment.

FIG. 13 illustrates a configuration of a gateway 300b generalized from the gateway 300 according to the first embodiment and the gateway 300a according to the modifications. In FIG. 13, a configuration associated mainly with the attack detection (including a configuration associated with protection) is represented by solid line blocks. The gateway 300b includes, as the configuration associated with the attack detection, a receiver 410, an updater 420, a storage 430, an examiner 440 and a processor 450. The receiver 410 has a function of receiving a frame from at least one bus, and the receiver 410 is equivalent to, for example, the reception function unit of the frame transmission/reception unit 310 in the gateway 300 or 300a. The updater 420 has a function of, in a case where a predetermined condition is satisfied for a frame received by the receiver 410, updating an examination parameter stored in the storage 430. The updater 420 is equivalent to, for example, a combination of the check unit 372, the check parameter storage 373, and the updater 374 of the invalidity detection process function set 370 in the gateway 300 or 300a. The storage 430 has a function of storing an examination parameter defining a content of a frame examination, and equivalent to, for example, the examination parameter storage 375 of the invalidity detection process function set 370 in the gateway 300 or 300a. The examiner 440 has a function of performing an examination based on the examination parameter stored in the storage 430 to determine whether a frame received by the receiver 410 is an attack frame or not. The examiner 440 is equivalent to, for example, the examiner 376 of the invalidity detection process function set 370 in the gateway 300 or 300a. The processor 450 has a function of performing a process depending on a result of the examination by the examiner 440 such that an influence of an attack frame on an ECU is suppressed. The processor 450 is equivalent to, for example, both or one of the function, possessed by the frame processor 350 of the gateway 300, of preventing an attack frame from being transferred and the function, possessed by the frame generator 380 of the gateway 300a, of transmitting an error frame in response to an attack frame. In this gateway 300b, an examination parameter, stored in the storage 430, for use by the examiner 440 to examine whether a frame is an attack frame or not, is updated by the updater 420 depending on the received frame and under a particular condition. This makes it possible to properly detect attack frames adaptively to a wide variety of variable attacks, and thus the processor 450 is capable of properly protect from attacks.

Other Embodiments

The first embodiment has been described above as an example of a technique according to the present disclosure. However, the technique according to the present disclosure is not limited to the example described above, but changes, replacements, additions, removals, or the like are possible as required. For example, modifications described below also fall in the scope of aspects of the present disclosure.

(1) In the embodiments described above, an example of the attack detection process by the invalidity detection process function set 370 is described above with reference to FIG. 10 in which the check process is performed, and the examination parameter is updated depending on the result of the check process, and thereafter the examination process is performed. However, the attack detection process is not limited to this example. For example, the attack detection process may be performed according to a first modification as described below with reference to FIG. 14. A check process in step S1002 and step S1003 and an examination process (a filtering process) in step S1006 and step S1007 are performed in parallel, and then, depending on a result of the check process, a judgment is performed as to whether it is necessary to update an examination parameter (step S1004). If necessary, the examination parameter is updated (step S1005), the examination process (the filtering process) may be performed using the updated examination parameter (step S1007). Note that the examination process performed in parallel to the check process may be similar in content to the examination process per formed after the examination parameter is updated (step S1005), or may be different in content (among the plurality of the examination functions used in the examination, some examination functions may be different). As described above, the timing of executing the examination process may be the same as or different from the timing of executing the check process for updating the examination parameter. If the examination parameter is updated, the examination process after the update is performed using the updated examination parameter. Furthermore, in the attack detection process, not only the examination parameter but also the check parameter may be updated depending on a content of the frame.

Figure 15:
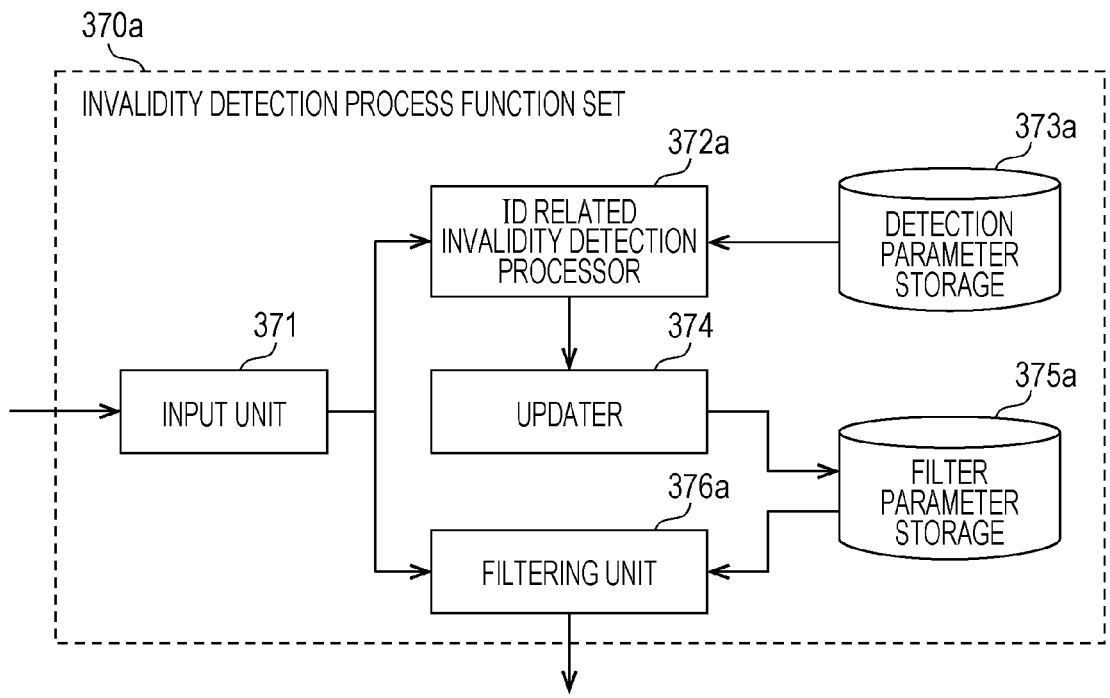
FIG. 15 is a configuration diagram illustrating a first modification of an invalidity detection process function set.
Figure 16:
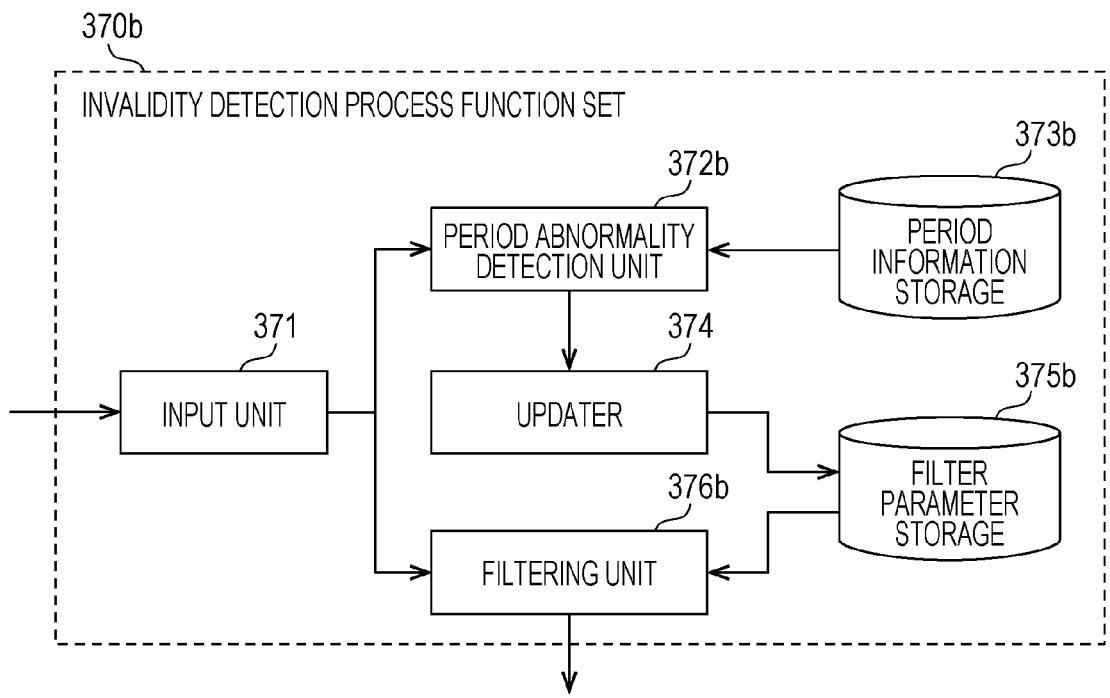
FIG. 16 is a configuration diagram illustrating a second modification of an invalidity detection process function set.
Figure 17:
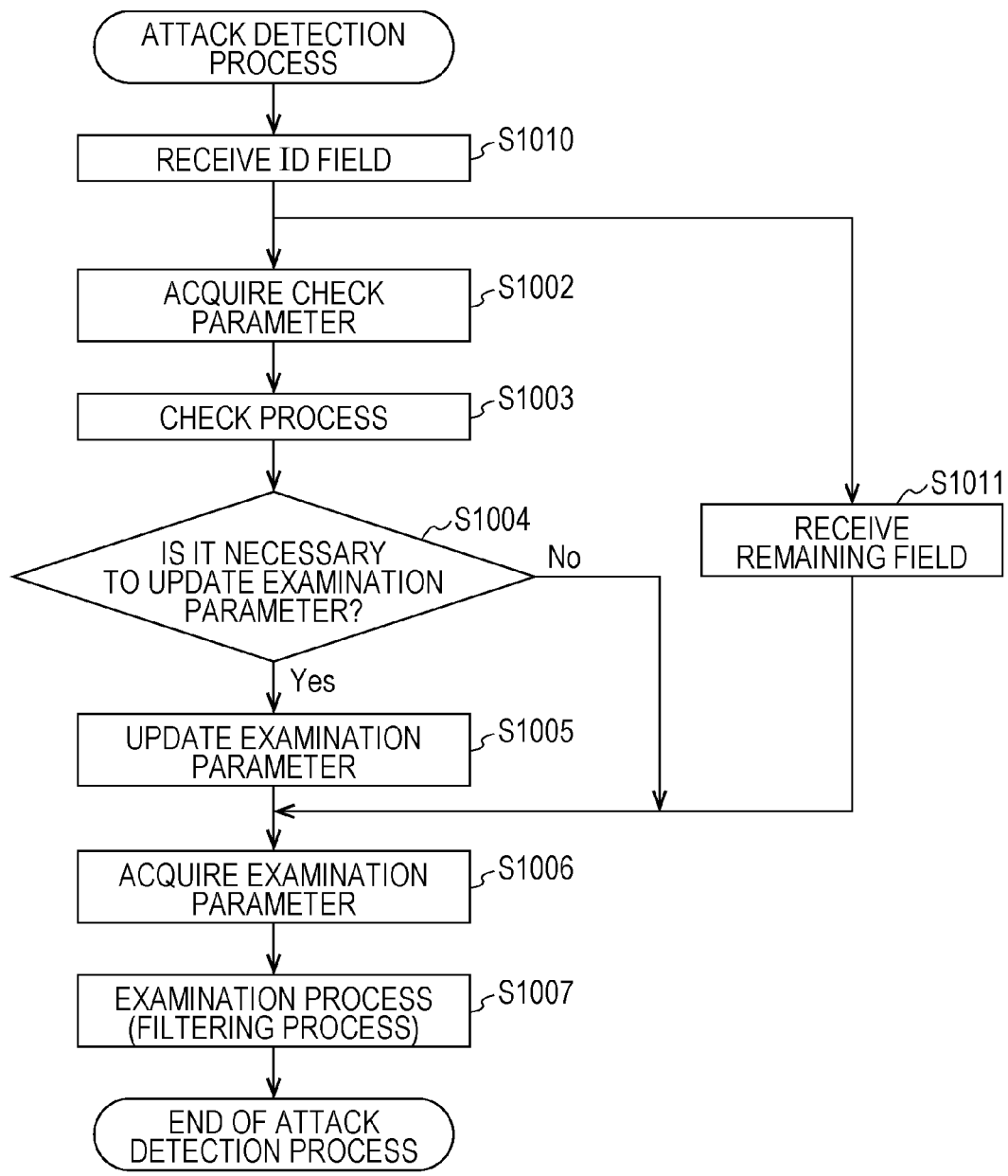
FIG. 17 is a flow chart illustrating a second modification of an attack detection process.

(2) The configuration of the invalidity detection process function set 370 according to the embodiment described above is merely an example. For example, the configuration may be modified such that instead of the check unit 372 having various check functions using check parameters stored in the check parameter storage 373, an ID related invalidity detection processor 372a for making a judgment as to invalidity only in term of the ID field may be used as illustrated in FIG. 15. The ID related invalidity detection processor 372a performs a judgement as to the invalidity, using the detection parameter stored in the detection parameter storage 373a. In a case where the judgement indicates invalidity, the updater 374 updates a filter parameter stored in the filter parameter storage 375a. Using this filter parameter, the filtering unit 376a examines a frame for filtering attack frames. The filter parameter storage 375a may be similar to the examination parameter storage 375. Furthermore, the filtering unit 376a may be similar to the examiner (filtering unit) 376. FIG. 16 illustrates another specific example of a modification of the invalidity detection process function set 370. The example illustrated in FIG. 16 includes a period abnormality detection unit 372b that checks the transmission time interval (the transmission period) of frames having the same message ID described in the ID field and detects whether the frames are transmitted at intervals that do not consistent with a rule stored in the period information storage 373b. In a case where period abnormality is detected, the updater 374 may perform a process to narrow the range specified by a filter parameter in terms of the range allowed for valid frames. The updater 374 may change an amount change of the filter parameter depending on an amount of deviation of the period from the allowable range. This example is basically equivalent to a case where the check unit 372 in the invalidity detection process function set 370 according to the first embodiment described above has only the check function of checking, only from the ID field, whether the predetermined condition is satisfied or not. In this case, in the attack detection process by the invalidity detection process function set 370, when the checking of the content of the ID field is being performed, the remaining fields may be received in parallel to the checking, as illustrated in FIG. 17. In the example illustrated in FIG. 17, at a point of time at which an ID field is received, the frame interpreter 320 or the frame processor 350 notifies the input unit 371 of the invalidity detection process function set 370 of a value of the ID field. Thereafter, the frame interpreter 320 or the frame processor 350 receives fields following the ID field, and, at a point of time when the reception is completed, the remaining fields are transmitted to the input unit 371 of the invalidity detection process function set 370. This makes it possible to start the process from step S1002 to S1005 at a time before the reception of the frame is completed. Furthermore, it is possible to perform in parallel the process from step S1002 to S1005 and the process in step S1011. Thus, it is possible to perform in parallel the reception of the data field, the check process, and the examination parameter update, which results in a reduction in the total processing time, and thus it becomes possible to increase the time allocated to the examination process for the filtering using the examination parameter.

Figure 18:
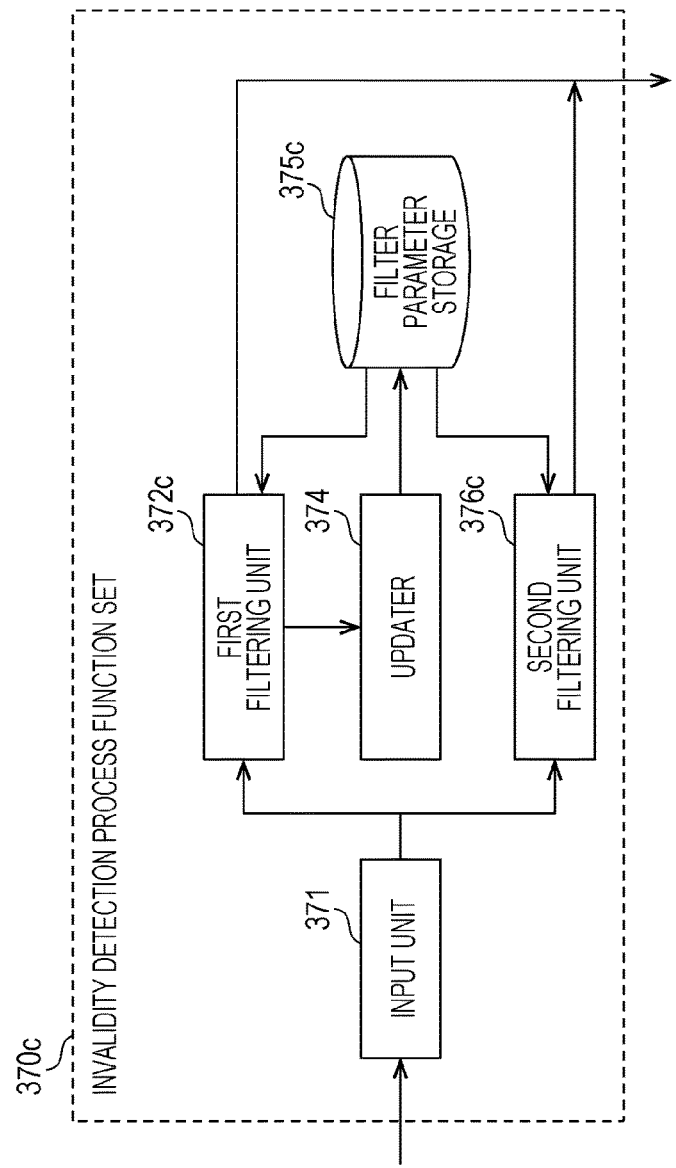
FIG. 18 is a configuration diagram illustrating a third modification of an invalidity detection process function set.
Figure 19:
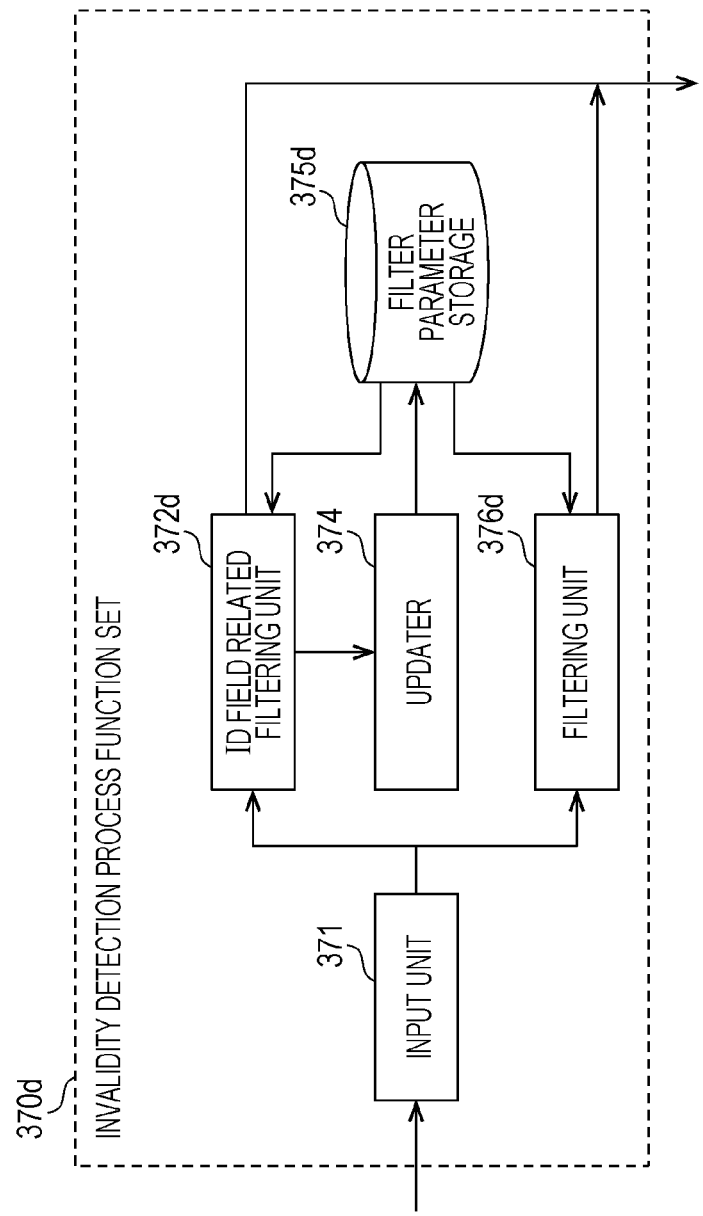
FIG. 19 is a configuration diagram illustrating a fourth modification of an invalidity detection process function set.

(3) The configuration of the invalidity detection process function set 370 according to the embodiment described above may be modified, for example, as illustrated in FIG. 18. An invalidity detection process function set 370c according to the modification illustrated in FIG. 18 includes a first filtering unit 372c that is realized by adding an examination function for filtering attack frames to the check unit 372. The filter parameter storage 375c may be similar to the examination parameter storage 375. The second filtering unit 376c may be similar to the examiner (filtering unit) 376. In this configuration, the first filtering unit 372c and the second filtering unit 376c may be the same or may be different in terms of the content of the examination process for filtering. Although in the example illustrated in FIG. 18, it is assumed by way of example but not limitation that the first filtering unit 372c and the second filtering unit 376c use the same filter parameter storage 375c. However, the first filtering unit 372c and the second filtering unit 376c may perform examination using different filter parameters (examination parameters). Note that as for a frame determined as an attack frame by the first filtering unit 372c, the examination process by the second filtering unit 376c may not be performed on this frame. Therefore, in a case where an attack frame is detected by the first filtering unit 372c, it is possible to execute, at an early stage, protection from the attack (it is possible to prevent the attack frame from being transferred, disabling the attack frame by transmitting an error frame). Even in a case where a frame is not determined as an attack frame by the first filtering unit 372c, it becomes possible to detect this attack frame by the second filtering unit 376c by updating a filter parameter (examination parameter). The first filtering unit 372c may be, as illustrated in FIG. 19, an ID field related filtering unit 372d that performs only filtering based on the ID field. FIG. 19 illustrates an invalidity detection process function set 370d modified such that the invalidity detection process function set 370d includes an ID field related filtering unit 372d, a filter parameter storage 375d, a filtering unit 376d, etc. In this configuration, it is possible to start an examination process for filtering at a point of time when an ID field is received, and thus it is possible to perform, in parallel, reception of a data field, and the examination process for filtering based on the ID field and the updating of parameters stored in the filter parameter storage 375d, and thus it becomes possible to increase the time allocated to the examination process for the filtering by the filtering unit 376d.

Figure 20:
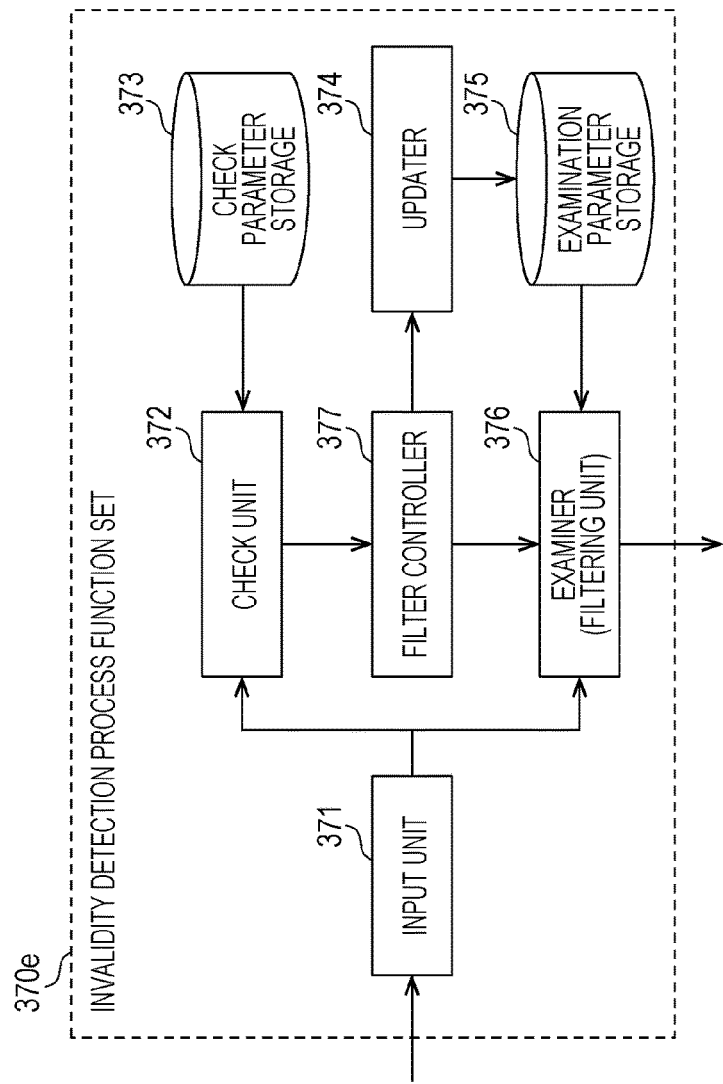
FIG. 20 is a configuration diagram illustrating a fifth modification of an invalidity detection process function set.

(4) The configuration of the invalidity detection process function set 370 according to the embodiment described above may be modified, for example, as illustrated in FIG. 20. In this invalidity detection process function set 370e according to the modification illustrated in FIG. 20, a filter controller 377 is provided between the check unit 372 and the examiner (the filtering unit) 376 and the updater 374. In the invalidity detector 372, each time a check process by any one of the check functions (the ID check function, the DLC check function, the transmission period check function, the frequency-of-transmission check function, etc.) is completed and a judgment result is obtained, the judgment result (the check result) is immediately sent to the filter controller 377. At a point of time when a check result necessary in updating an examination parameter is obtained, the filter controller 377 controls the updater 374 to update the examination parameter. Furthermore, the filter controller 377 manages the parameters associated with the respective examination functions of the examiner 376 (the ID examination function, the DLC examination function, the transmission period examination function, the frequency-of-transmission examination function, and the like) in terms of whether the parameters are updated into states usable in the examinations. When a parameter is updated into a usable state, the filter controller 377 controls the examiner 376 to execute a corresponding examination function. For example, the filter controller 377 may control a specific examination function to be executed after a check function associated with updating a parameter, of examination parameters, used by this specific examination function in receiving one frame (after the parameter is updated depending on the check result). Thus, at a stage in which all check results of check functions have not yet obtained, it is possible to perform an examination associated with a part of examination functions (for example, an examination for filtering), which makes it possible to quickly handle an attack frame for protection.

Figure 21:
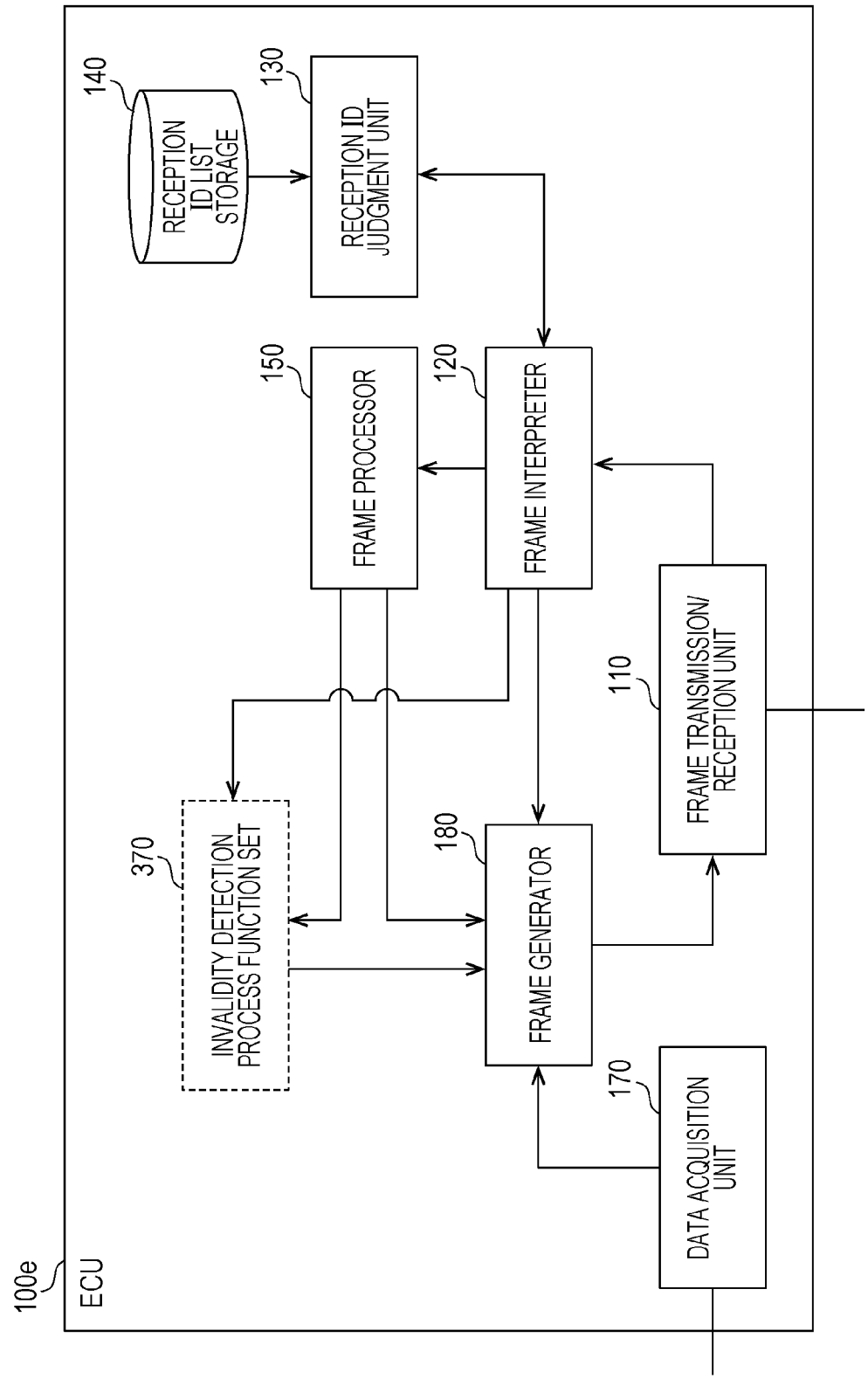
FIG. 21 is a configuration diagram illustrating a first modification of an ECU.
Figure 22:
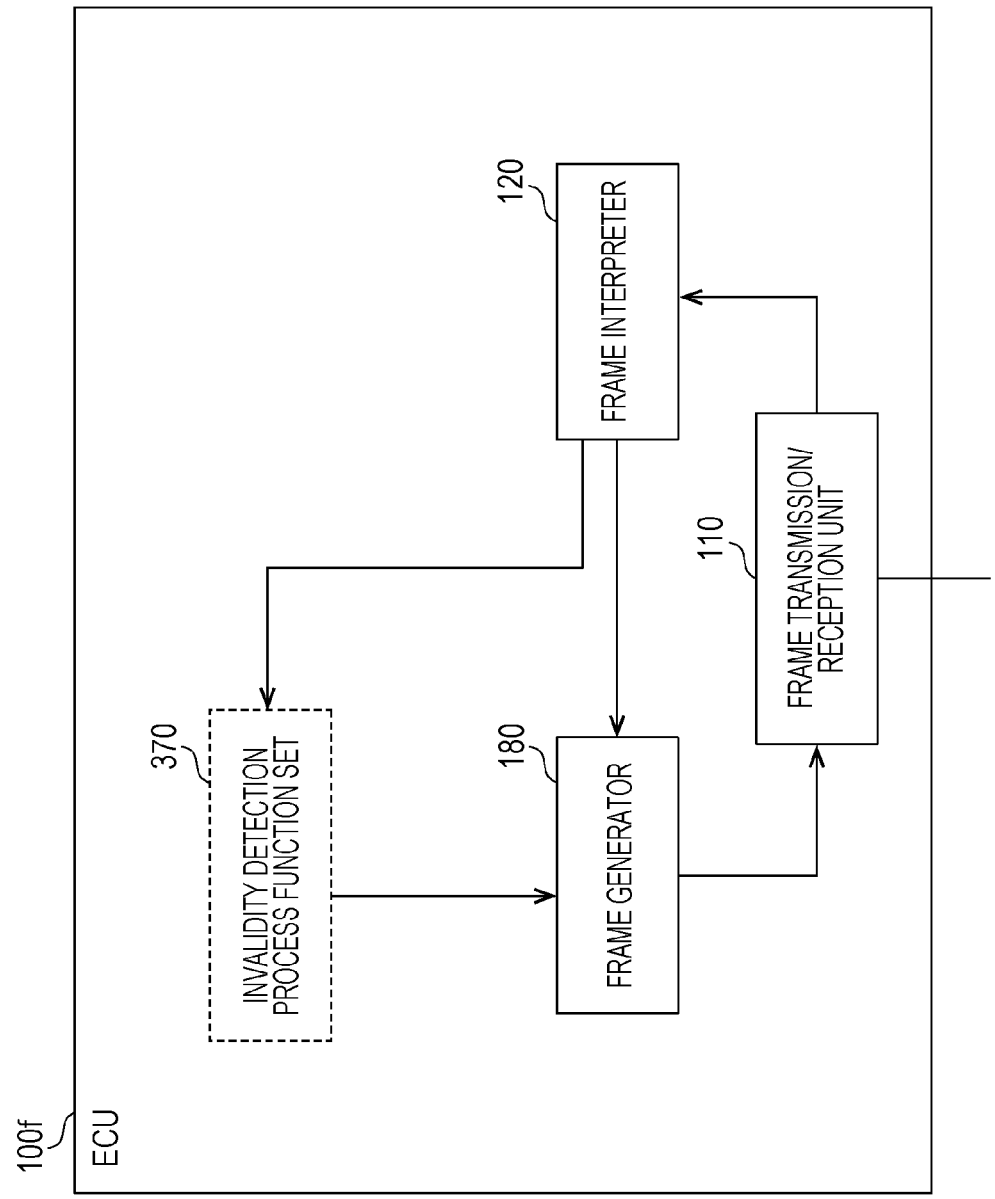
FIG. 22 is a configuration diagram illustrating a second modification of an ECU.
Figure 23:
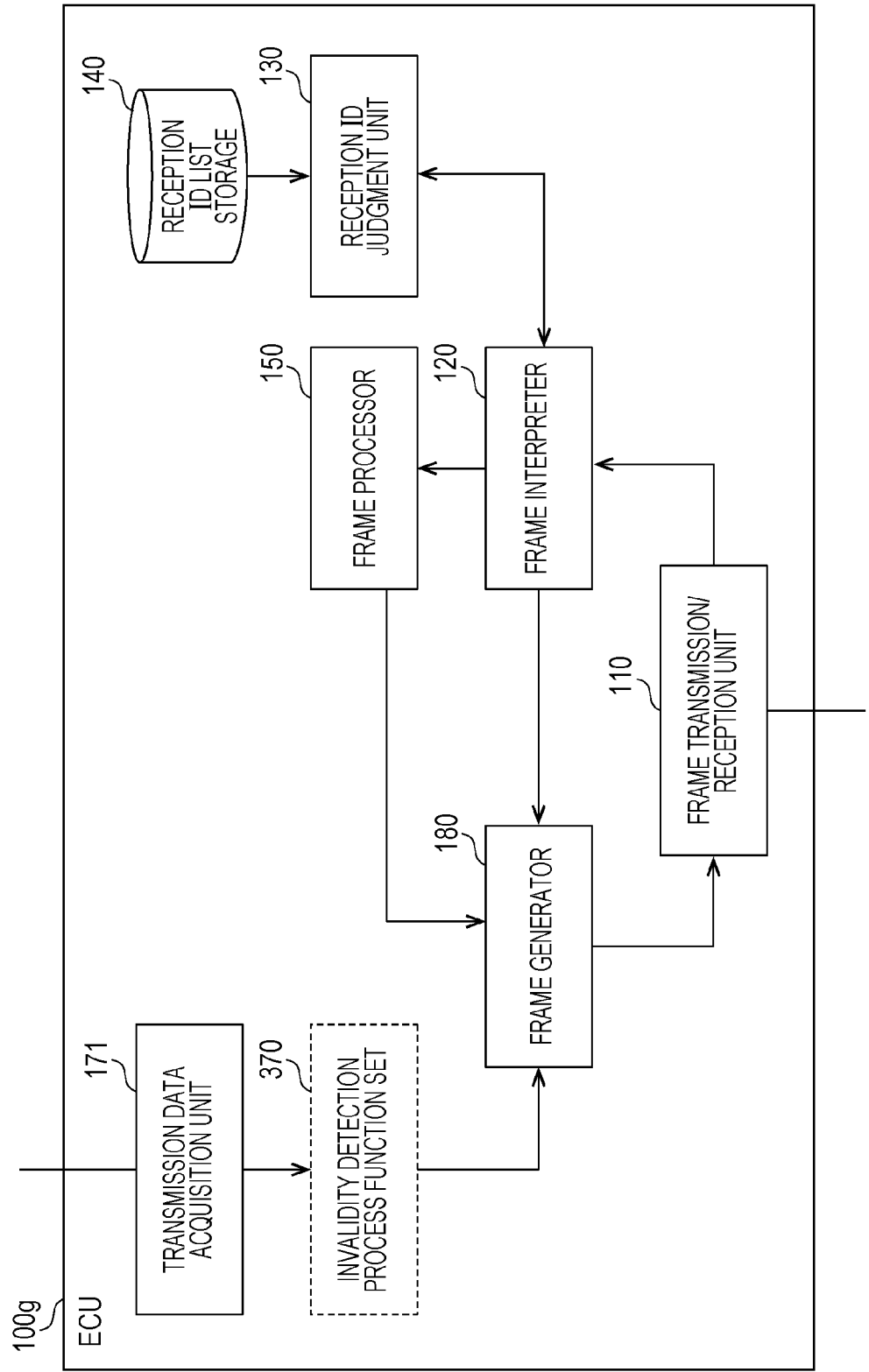
FIG. 23 is a configuration diagram illustrating a third modification of an ECU.

(5) The configuration of the ECU (ECUs 100a to 100d) in the on-board network system 10 according to the embodiment described above, is not limited to the example illustrated in FIG. 9. For example, as with an ECU 100e illustrated in FIG. 21, an invalidity detection process function set 370 may be provided. In the ECU according to the modification illustrated in FIG. 21, the frame processor 150 may request the invalidity detection process function set 370 to detect an attack (to judge whether a frame is an attack frame or not), or the frame interpreter 120 may request the invalidity detection process function set 370 to detect an attack. The configuration of the ECU may be modified, for example, as in an ECU 100f illustrated in FIG. 22, such that the ECU includes a frame transmission/reception unit 110, a frame interpreter 120, a frame generator 180, and an invalidity detection process function set 370. In the ECU according to the modification illustrated in FIG. 22, the frame interpreter 120 receives all frames and requests the invalidity detection process function set 370 to detect an attack. Furthermore, in addition to elements in the configuration of the ECU 100f illustrated in FIG. 22, the ECU may further include the reception ID judgement unit 130 and the reception ID list storage 140 illustrated in FIG. 9, and the ECU may receive only a frame whose message ID is equal to one of message IDs described in a reception ID list stored in the reception ID list storage 140, and the frame interpreter 120 requests the invalidity detection process function set 370 to detect an attack (to determine whether this frame is an attack frame or not). Thus in the on-board network system 10, as described above, not only the gateway 300 but also other ECUs are capable of functioning as a security apparatus that detects a frame being transmitted over a bus is an attack frame or not. The ECU may also be modified so as to have a configuration, for example, similar to a configuration of an ECU 100g illustrated in FIG. 23. The ECU according to the modification illustrated in FIG. 23 includes a transmission data acquisition unit 171 that acquires, from an external apparatus (for example, a car navigation apparatus), data to be transmitted to the bus 200, and the invalidity detection process function set 370 judges whether the data received from the transmission data acquisition unit 171 is an attack frame or not. Only in a case where it is determined that the data is not an attack frame, the invalidity detection process function set 370 may request the frame generator 180 to transmit a frame. By employing this configuration, in a case where an attack frame is transmitted to the ECU from a car navigation apparatus or the like, it becomes possible to detect an attack and protect from the attack.

(6) In the embodiments described above, in response to receiving the judgement result from the check unit 372, the updater 374 determines an examination parameter (a threshold value or the like) which is necessary to be updated, and the updater 374 updates the determined examination parameter. However, the updater 374 may update an examination parameter taking into account a condition other than a judgement result by the check unit 372. For example, in the determination of an examination parameter necessary to be updated or determination of a value to which the examination parameter it to be updated, in addition to a judgement result by the check unit 372, the updater 374 may also take into account a state of a vehicle (for example, a vehicle speed, a stopped state, a running state), a configuration of a device (ECU or the like) connected to a bus in the on-board network system 10, a previous judgement result given by the check unit 372, or the like. For example, in a case where an examination parameter is updated based on a state of a vehicle, the examination parameter update may not be performed if the vehicle is in a stopped state, or the examination parameter may be updated by a small amount. In a case where a vehicle including the on-board network system 10 has a plurality of drive assist functions, when some particular drive assist function is in operation, a parameter (a threshold value or the like) in terms of a frame associated with another drive assist function that never operates when that particular drive assist function is in operation may be changed so as to increase the probability that this frame is determined as an attack frame. In the determination as to whether the frame is this attack frame or not, the judgement may be simply made only based on a message ID, or the determination of the attack frame may be performed by examining a specific bit of a data field. In a case where the process of updating an examination parameter is performed also taking into account the configuration of a device connected to a bus, for example, in a situation in which the number of devices such as a car navigation apparatus capable of communicating with an external device is equal to or greater than a particular value, an examination parameter may be changed so as to increase the probability that frames are determined as attack frames.

(7) In the embodiments described above, the criterion or the algorithm used in determining examination parameters to be updated by the updater 374 or the degree to which examination parameter are updated is determined when the gateway 300 is produced. However, alternatively, the criterion or the algorithm may be changed after the gateway 300 is produced (after the gateway 300 is shipped from a factory). As for the method of changing the criterion, the algorithm, or the like, data associated with changing may be received from the outside and the changing may be performed using this data, or data may be read out from a removable storage medium (an optical disk, a magnetic disk, a semiconductor medium, or the like) and the changing may be performed using this data.

(8) The receiver 410, the updater 420, the storage 430, the examiner 440 and the processor 450, which are components of the gateway 300b according to the modification of the first embodiment, may be disposed not in the gateway but in the ECU (ECUs 100a to 100g, etc.). In this case, the receiver 410 is a reception function unit of the frame transmission/reception unit 110.

The storage 430 may be, for example, the examination parameter storage 375 of the invalidity detection process function set 370 or 370e or the filter parameter storages 375a to 375d of the invalidity detection process function sets 370a to 370d, or the like. The storage 430 stores a plurality of examination parameters different from each other and defining contents of examinations on frames. The plurality of examination parameters include, for example, one or more of the following: an ID examination parameter associated with an examination of an ID value; a DLC examination parameter associated with an examination of a DCL value; a transmission period examination parameter associated with an examination of a transmission period; a frequency-of-transmission examination parameter associated with an examination of the frequency of transmission; and a data examination parameter associated with an examination of a value of data stored in a data field. The frequency-of-transmission examination parameter may include a threshold value indicating an upper limit of an allowable range of the frequency of transmission, the data examination parameter may include a threshold value indicating an upper limit of an allowable range of a change in data stored in the data field, the transmission period examination parameter may include a threshold value indicating an allowable range of the transmission period, and the DLC examination parameter may include a threshold value indicating an allowable range of a value of the DLC. The data examination parameter may include a threshold value indicating an allowable range of a value of the data.

The updater 420 may be a combination of the check unit 372, the check parameter storage 373, and the updater 374 which are components of the invalidity detection process function set 370 or 370e, or a combination of the ID related invalidity detection processor 372a, the detection parameter storage 373a, and the updater 374 which are components of the invalidity detection process function set 370a, or a combination of the period abnormality detection unit 372b, the period information storage 373b, and the updater 374 which are components of the invalidity detection process function set 370b, or a combination of the first filtering unit 372c, part or all of the filter parameter storage 375c, and the updater 374 which are components of the invalidity detection process function set 370c, or a combination of the ID field related filtering unit 372d, part or all of the filter parameter storage 375d, and the updater 374. To determine whether each of a plurality of predefined conditions is satisfied or not for a frame received from the receiver 410, the updater 420 has check functions corresponding to respective conditions, and the updater 420 determines which one of a plurality of examination parameters stored in the storage 430 is to be subjected to updating depending on a judgement result of each check function, and the updater 420 updates the examination parameter. The updater 420 may have one or more check functions including, for example, the ID check function, the DLC check function, the transmission period check function, the frequency-of-transmission check function, and the data check function. For example, in the transmission period check function, when the reception interval between two frames having the same ID value is out of a predetermined allowable range, it may be determined that a condition corresponding to the transmission period check function is satisfied. For example, in a case where it is determined that the condition corresponding to the transmission period check function is satisfied, the updater 420 may update one of a plurality of examination parameters. When the transmission period check function judges that the condition is satisfied, the updater 420 may update the threshold value in the frequency-of-transmission examination parameter. When the transmission period check function judges that the condition is satisfied, the updater 420 may update the threshold value in the data examination parameter to a smaller value. When the frequency of transmission is greater than the upper limit of the predetermined allowable range, the updater 420 may judge that the condition corresponding to the frequency-of-transmission check function is satisfied and the updater 420 may update the threshold value in the transmission period examination parameter. When the frequency-of-transmission check function judges that the condition is satisfied for one frame, the updater 420 may update the threshold value in the plurality of examination parameters used as contents of examinations on frames having the same ID as the ID of the one frame such that the corresponding allowable range is narrowed. Furthermore, when a predetermined condition is satisfied for a frame received by the receiver 410, the updater 420 may judge that this frame is an attack frame.

The examiner 440 may be the examiner (filtering unit) 376 of the invalidity detection process function set 370 or 370e, may be the filtering unit 376a of the invalidity detection process function set 370a, may be the filtering unit 376b of the invalidity detection process function set 370b, may be the second filtering unit 376c of the invalidity detection process function set 370c, and may be the filtering unit 376d of the invalidity detection process function set 370d. The processor 450 may be at least one of the frame processor 150 and the frame generator 180 in the ECU. The examiner 440 may perform an examination based on each of the plurality of examination parameters stored, for example, in the storage 430, and, for example, in a case where the frequency of transmission of a frame received by the receiver 410 is greater than the threshold value in the frequency-of-transmission examination parameter, the examiner 440 may judge that this frame is an attack frame. In a case where a change in data stored in the data field of a frame received by the receiver 410 is greater than the threshold value in the data examination parameter, the examiner 440 may judge that this frame is an attack frame. The examiner 440 may perform an examination after the ID field of a frame received by the receiver 410 and before a part (the CRC field) following the data field is received, and the processor 450 may transmit an error frame in response to an attack frame.

In the gateway, the ECU, or the like, a control unit similar to the filter controller 377 of the invalidity detection process function set 370e (see FIG. 20) may be provided. At a point of time when judgement results of check functions are obtained for respective check functions possessed by the updater 420, the control unit determines whether any one of the plurality of examination parameter is to be updated based on the judgement results. If some examination parameter is to be updated, the control unit controls the updater 420 to update the examination parameter determined to be updated, and control unit controls the examiner 440 to perform examinations based on the respective associated examination parameters depending on the states of updating of the respective examination parameters.

(9) In the embodiments described above, the on-board network has been described as an example of a network communication system that performs communication according to the CAN protocol. The technique according to the present disclosure is not limited for use in the on-board network. The technique according to the present disclosure may be used in a network associated with a robot, an industrial apparatus, or the like, or network communication systems, other than the on-board network, that perform communication according to the CAN protocol. As for the CAN protocol, it should be understood that derivative versions of CAN protocol such as CANOpen used in an embedded system in an automation system or the like, TTCAN (Time-Triggered CAN), CANFD (CAN with Flexible Data Rate), etc. also fall in the scope of CAN protocol. In the on-board network system 10, communication protocols other than the CAN protocol, such as Ethernet (registered trademark), MOST (registered trademark), FlexRay (registered trademark), etc. may be used.

(10) The execution order of various processes disclosed in the embodiments described above (for example, processing procedures illustrated in FIG. 10, FIG. 11, FIG. 14, and FIG. 17) is not limited to the order described above, but modifications of the execution order such as reordering, parallel execution of a plurality of procedures, removal of part of the procedures, or the like are possible without departing from the scope of the disclosure.

(11) In the embodiments described above, the gateway and other ECUs are apparatuses which include, for example, a digital circuit such as a processor, a memory, or the like, an analog circuit, a communication circuit, or the like. However they may include other hardware components such as a hard disk apparatus, a display, a keyboard, a mouse, or the like. Instead of realizing functions by means of software by executing controls programs stored in a memory by a process, functions may be realized by dedicated hardware (a digital circuit or the like).

(12) Part or all of the constituent elements of each apparatus in the embodiment described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI. Each of the constituent elements of each apparatus described above may be integrated separately on a single chip, or part of all of the apparatus may be integrated on a single chip. The LSI here may be referred to as an IC, a system LSI, a super LSI, or an ultra LSI depending on a difference in the degree of integration. The technique of implementing an integrated circuit is not limited to the LSI and may be realized by using a dedicated circuit or a general-purpose processor. In addition, a FPGA (Field Programmable Gate Array) that may be programmed after the manufacture of the LSI or a reconfigurable processor in which the connections and the settings of circuit cells disposed inside the LSI may be reconfigured may be used. If future integrated circuit technology replaces LSIs as a result of the advancement of semiconductor technology or other derivative technology, the functional blocks may be integrated using the future integrated circuit technology. Biotechnology can also be applied.

(13) Part or all of the constituent elements of each apparatus described above may be implemented in the form of an IC card attachable to the apparatus or in the form of a single module. The IC card or the module is a computer system including a microprocessor, a ROM, a RAM, and so on. The IC card or the module may include the super-multifunction LSI described above. In the IC card or the module, the microprocessor operates according to the computer program thereby achieving the function of the IC card or the module. The IC card or the module may be configured so as to be resistant against tampering.

Figure 14:
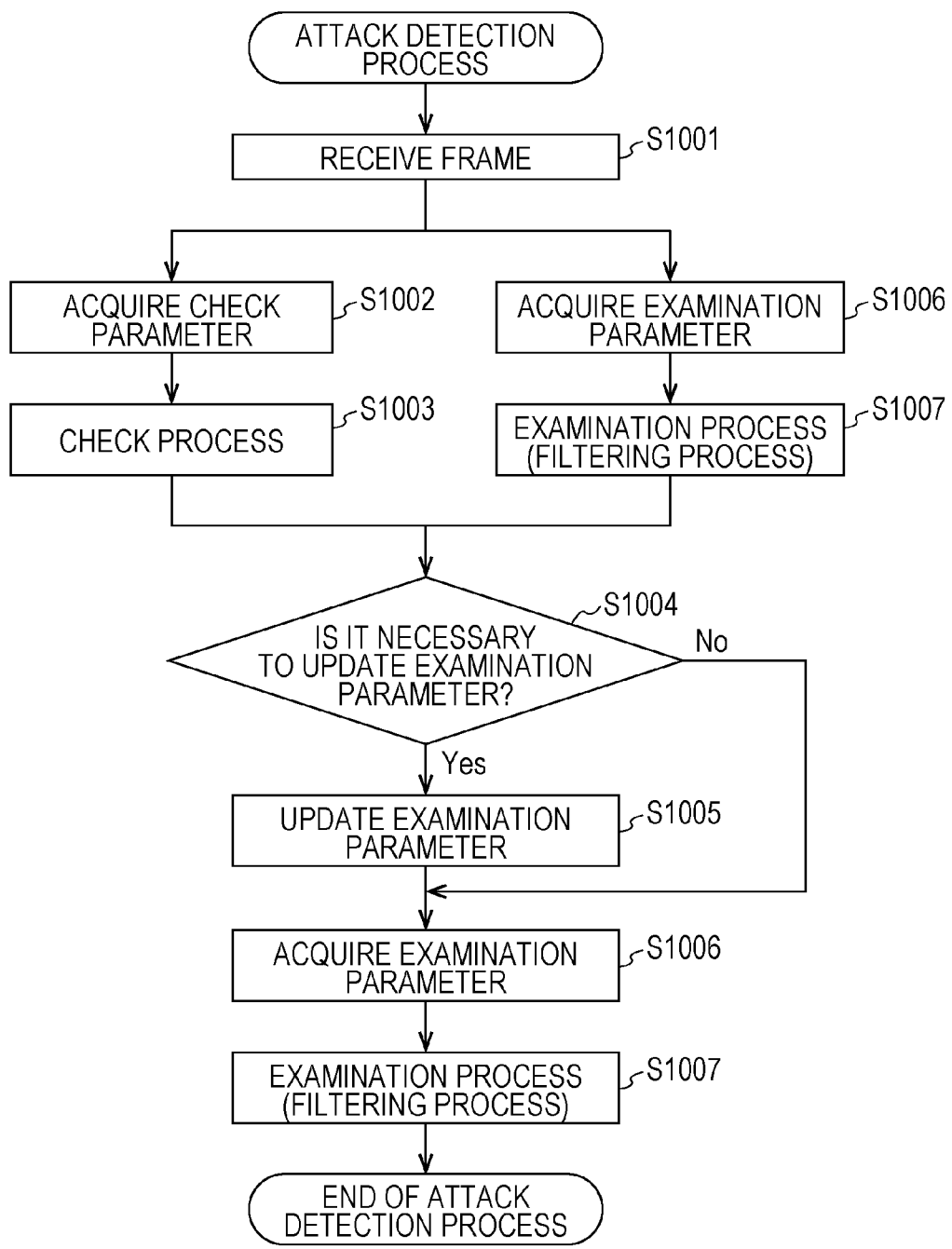
FIG. 14 is a flow chart illustrating a first modification of an attack detection process.

(14) According to an aspect, the present disclosure may provide an attack detection method including all or part of processing procedures illustrated, for example, in FIG. 10, FIG. 14, FIG. 17, or elsewhere. For example, the attack detection method is used in the on-board network system 10 in which a plurality of ECUs transmit and receive frames via one or a plurality of buses, and the attack detection method includes a reception step, an update step, and an examination step. In the reception step, a frame is received from a bus. In the update step, in a case where a condition predefined is satisfied for a frame received in the reception step, an examination parameter defining a content of an examination on the frame is updated. In the examination step, based on the examination parameter updated in the update step, an examination is performed as to a determination of whether the frame received in the reception step is an attack frame or not. A process (an attack detection process) associated with the attack detection method may be implemented in a computer program (a control program) executed by a computer or may be implemented by a digital signal related to the computer program. For example, the control program is for causing a processor to execute the attack detection process including the reception step (for example, step S1001), the update step (for example, steps S1002 to S1005), and the examination step (for example, steps S1006 and S1007). In an aspect, the present disclosure may be implemented by a computer readable storage medium, such as a flexible disk, a hard disk, a CD-ROM, an MO disk, a DVD disk, a DVD-ROM disk, a DVD-RAM disk, a BD (Blu-ray Disc), a semiconductor memory, or the like in which the computer program or the digital signal are stored. The present disclosure may be implemented by the digital signal stored in the storage medium described above. In an aspect, the present disclosure may be implemented by transmitting the computer program or the digital signal via a telecommunication line, a wired or wireless communication line, a network typified by the Internet, data broadcasting, or the like. In an aspect, the present disclosure may be implemented by a computer system including a microprocessor and a memory, wherein the computer program is stored in the memory and the microprocessor operates according to the computer program. The program or the digital signal may be stored in the storage medium and the storage medium may be transported, or the program or the digital signal may be transferred via the network or the like thereby allowing the present disclosure to be implemented in another computer system.

(15) Any embodiment realized by an arbitrary combination of constituent elements and functions disclosed above in the embodiments and modifications also fall in the scope of the present disclosure.

The present disclosure is usable to properly detect a transmission of an attack frame in an on-board network.

What is claimed is:

1. A security apparatus connected to at least one bus, comprising:
   a receiver that receives a frame from the at least one buses;
   a parameter storage that stores at least one examination parameter defining a content of an examination on a frame;
   processing circuitry that, in operation, performs operations including
      judging whether a predetermined condition is satisfied for the frame received by the receiver;
      in a case where the predetermined condition is judged to be satisfied for the frame received by the receiver, updating the at least one examination parameter stored in the parameter storage;
      in a case where the predetermined condition is judged not to be satisfied for the frame received by the receiver, not updating the at least one examination parameter stored in the parameter storage;
      executing an examination, based on the at least one examination parameter stored in the parameter storage after the judging, as to whether the frame received by the receiver is an attack frame; and
      performing a process depending on a result of the execution of the examination such that an influence of an attack frame on at least one electronic control unit is suppressed,
   wherein the security apparatus is installed in a vehicle, and
   wherein the vehicle includes the at least one electronic control unit that transmits and receives a frame via the at least one bus according to Controller Area Network (CAN) protocol.

2. The security apparatus according to claim 1,
wherein the at least one examination parameter includes a plurality of examination parameters defining contents of examinations on a frame, the contents being different from each other, and
the operations further include
   judging whether each of a plurality of predetermined conditions is satisfied for the frame received by the receiver, and
   depending on a result of the judgment, determining an examination parameter to be subjected to updating from the plurality of examination parameters,
wherein the updating updates the determined examination parameter.

3. The security apparatus according to claim 2,
wherein the frame received by the receiver is a data frame including an ID field storing an ID, Data Length Code (DLC), and a data field,
the judging including at least one of the following
   judging whether a first condition is satisfied for a value of the ID;
   judging whether a second condition is satisfied for a value of the DLC;
   judging whether a third condition is satisfied for a value of the DLC;
   judging whether a fourth condition is satisfied for a frequency of transmission of one or more frames having the same value of the ID in a predetermined unit time; and
   judging whether a fifth condition is satisfied for a value stored in the data field;
the plurality of examination parameters including
   an ID examination parameter associated with the examination of the value of the ID;
   a DLC examination parameter associated with the examination of the value of the DLC;
   a transmission period examination parameter associated with the examination of the transmission period;
   a frequency-of-transmission examination parameter associated with the examination of the frequency of transmission; and
   a data examination parameter associated with the examination of the value of the data stored in the data field,
   the executing of the examination being performed based on each of the plurality of examination parameters.

4. The security apparatus according to claim 3,
wherein the judging is executed by referring to the ID stored in the ID field of the frame received by the receiver at least for one of the plurality of predetermined conditions.

5. The security apparatus according to claim 3,
wherein the third condition is that a reception interval between two frames having the same value of the ID is out of a predetermined allowable range.

6. The security apparatus according to claim 5,
wherein the plurality of examination parameters include the frequency-of-transmission examination parameter, the frequency-of-transmission examination parameter includes a threshold value indicating an upper limit of an allowable range of the frequency of transmission, in the executing of the examination, in a case where the frequency of transmission of the frame received by the receiver is larger than the threshold value in the frequency-of-transmission examination parameter, it is judged that the frame is an attack frame, and in the updating, in a case where it is judged that the third condition is satisfied, the threshold value in the frequency-of-transmission examination parameter is updated.

7. The security apparatus according to claim 5, wherein the plurality of examination parameters include the data examination parameter, the data examination parameter includes a threshold value indicating an upper limit of an allowable range in which the data stored in the data field is allowed to change, in the executing of the examination, in a case where a change in the data stored in the data field of the frame received by the receiver is greater than the threshold value in the data examination parameter, it is judged that the frame is an attack frame, and in the updating, in a case where it is judged that the third condition is satisfied, the threshold value in the data examination parameter is updated to a smaller value.

8. The security apparatus according to claim 3, wherein the fourth condition is that the frequency of transmission is greater than an upper limit of a predetermined allowable range, the plurality of examination parameters include the transmission period examination parameter, the transmission period examination parameter includes a threshold value indicating an allowable range of the transmission period, and in the updating, in a case where it is judged that the fourth condition is satisfied, the threshold value in the transmission period examination parameter is updated.

9. The security apparatus according to claim 3, wherein the fourth condition is that the frequency of transmission is greater than an upper limit of a predetermined allowable range, each of the plurality of examination parameters is one of the following: the DLC examination parameter; the transmission period examination parameter; and the data examination parameter, the DLC examination parameter includes a threshold value indicating an allowable range of a value of the DLC, the transmission period examination parameter includes a threshold value indicating an allowable range of the transmission period, the data examination parameter includes a threshold value indicating an allowable range of a value of the data, and in the updating, in a case where it is judged that the fourth condition is satisfied for one frame, the threshold value in the plurality of examination parameters used as a content of an examination on a frame having the same ID as the ID of the one frame is updated such that a corresponding allowable range is narrowed.

10. The security apparatus according to claim 3, wherein the executing of the examination is performed after the ID field of the frame is received and before a part following the data field is received.

11. The security apparatus according to claim 2, wherein the operations further include at a point of time when judgment results are obtained for the respective predetermined conditions, determining whether the plurality of examination parameters includes an examination parameter that is to be updated depending on the judgment results, in the updating, in a case where it is determined that updating is to be performed, updating the examination parameter determined to be updated, and performing the executing of the examination depending on a state of updating of each of the plurality of examination parameters.

12. The security apparatus according to claim 1, wherein in the executing of the examination, in a case where the predetermined condition is satisfied for the frame received by the receiver, it is judged that the frame is an attack frame, and in the executing of the process, the process is performed on the frame judged as the attack frame such that an influence of the attack frame on at least one electronic control unit is suppressed.

13. A method for an on-board network system in which a plurality of electronic control units transmit and receive a frame via at least one bus, the method comprising:

receiving, by a receiver, a frame from the at least one bus;

judging whether a predetermined condition is satisfied for the frame received by the receiver;

in a case where the predetermined condition is judged to be satisfied for the frame received in the receiving, updating an examination parameter defining a content of a frame examination;

in a case where the predetermined condition is judged not to be satisfied for the frame received by the receiver, not updating the at least one examination parameter stored in the parameter storage;

executing an examination, based on the updated examination parameter after the judging, as to whether the frame received in the receiving is an attack frame or not; and performing a process depending on a result of the execution of the examination such that an influence of an attack frame on at least one electronic control unit is suppressed, wherein the on-board network system is installed in a vehicle, and wherein the vehicle includes the at least one electronic control unit that transmits and receives a frame via the at least one bus according to Controller Area Network (CAN) protocol.

14. A computer-readable non-transitory storage medium storing a program, the program causing, when executed by a processor disposed in a security apparatus connected to least one bus, the processor to execute a method, the method comprising:

receiving, by a receiver, a frame from the at least one bus;

judging whether a predetermined condition is satisfied for the frame received by the receiver;

in a case where the predetermined condition is judged to be satisfied for the frame received in the receiving, updating an examination parameter defining a content of a frame examination;

in a case where the predetermined condition is judged not to be satisfied for the frame received by the receiver, not updating the at least one examination parameter stored in the parameter storage;

executing an examination, based on the updated examination parameter after the judging, as to whether the frame received in the receiving is an attack frame or not; and performing a process depending on a result of the execution of the examination such that an influence of an attack frame on at least one electronic control unit is suppressed, wherein the on-board network system is installed in a vehicle, and wherein the vehicle includes the at least one electronic control unit that transmits and receives a frame via the at least one bus according to Controller Area Network (CAN) protocol.

* * * * *